(12) United States Patent
Bata et al.

(10) Patent No.: US 6,901,403 B1
(45) Date of Patent: May 31, 2005

(54) XML PRESENTATION OF GENERAL-PURPOSE DATA SOURCES

(75) Inventors: Anthony P. Bata, Superior, CO (US); Clayton T. Boyd, Boulder, CO (US)

(73) Assignee: Quovadx, Inc., Englewood, CO (US)

( * ) Notice: Subject to any disclaimer, the term of this patent is extended or adjusted under 35 U.S.C. 154(b) by 342 days.

(21) Appl. No.: 09/952,978

(22) Filed: Sep. 14, 2001

Related U.S. Application Data

(63) Continuation-in-part of application No. 09/798,572, filed on Mar. 2, 2001.
(60) Provisional application No. 60/186,552, filed on Mar. 2, 2000.

(51) Int. Cl.[7] .............................. G06F 7/00; G06F 17/00
(52) U.S. Cl. ........................ 707/101; 707/100; 715/513; 715/514
(58) Field of Search .......................... 707/1–3, 10, 100, 707/101, 203; 715/511, 513–514; 717/100, 114, 122

(56) References Cited

U.S. PATENT DOCUMENTS

| | | |
|---|---|---|
| 5,499,371 A | 3/1996 | Henninger et al. |
| 5,797,137 A | 8/1998 | Golshani et al. |
| 5,832,498 A | 11/1998 | Exertier |
| 5,873,093 A | 2/1999 | Williamson et al. |
| 5,953,522 A | 9/1999 | Fox et al. |
| 5,961,582 A | 10/1999 | Gaines |
| 6,076,090 A | 6/2000 | Burroughs et al. |
| 6,101,502 A | 8/2000 | Heubner et al. |
| 6,112,209 A | 8/2000 | Gusack |
| 6,332,155 B1 | 12/2001 | Notani ........................ 709/205 |
| 6,397,191 B1 | 5/2002 | Notani et al. .................. 705/9 |
| 6,513,038 B1 | 1/2003 | Hasegawa et al. |
| 6,519,612 B1 | 2/2003 | Howard et al. |
| 6,567,783 B1 | 5/2003 | Notani et al. .................. 705/9 |
| 6,584,507 B1 | 6/2003 | Bradley et al. .............. 709/229 |
| 6,618,727 B1 | 9/2003 | Wheeler et al. .............. 707/10 |
| 2001/0047372 A1 | 11/2001 | Gorelik et al. |
| 2002/0105537 A1 * | 8/2002 | Orbanes et al. ............. 345/733 |
| 2002/0184225 A1 | 12/2002 | Ghukasyan |
| 2003/0046300 A1 | 3/2003 | Arai |

OTHER PUBLICATIONS

Office Action Dated Dec. 4, 2003, U.S. Ser. No. 09/952,979.
Office Action dated Dec. 17, 2003, U.S. Ser. No. 10/007,971.
St. Laurent & Cerami, "Building XML Applications" Chapter 3, pp. 27–55, "XML and Other Distributed Application Technologies" Copyright © 1999, Publisher McGraw–Hill Companies, Inc., New York.
Overview, RioLabs Web Page [online]. RioLabs, Inc. [Retrieved on Jun. 1, 2001] Retrieved from the Internet:<URL:http//www.riolabs.com/company/index.shtml.
XML in the Oracle Internet File System. Whitepaper [online].Oracle Corporation, Nov. 22, 2000. [Retrieved on Jun. 1, 2001] Retrieved from the Internet:<URL:http://technet.oracle.com/products/ifs/pdf/xml_ifs.pdf, pp 1–9.

(Continued)

*Primary Examiner*—Alford Kindred
(74) *Attorney, Agent, or Firm*—Thelen Reid & Priest LLP; David B. Ritchie

(57) ABSTRACT

A system and method for presenting one or more general-purpose application-accessible data sources as an XML representation is discussed. Information that describes the way data is structured or organized in the data source is accessed from the data source. A virtual file system representation comprising a plurality of hierarchical folders is provided to represent the structural information. Optionally, the virtual file system representation may be modified, either manually or according to rules sets. After any desired modification, the XML representation is generated based on the virtual file system representation.

28 Claims, 18 Drawing Sheets

OTHER PUBLICATIONS

B2B transaction and collaberation, Web Page [online]. RioLabs, Inc. [Retrieved on Jun. 1, 2001] Retrieved from the Internet:<URL:http://www.riolabs.com/product/index.shtml, pp. 1.

RioTrade Overview, Web Page [online]. RioLabs, Inc. [Retrieved on Jun. 1, 2001] Retrieved from the Internet: <URL:http://www.riolabs.com/product/riotrade.shtml, pp. 1–3.

RioTrade: A Technical Perspective. Whitepaper [online] .RioLabs, Inc. Mar. 2001 [Retrieved on Jun. 1, 2001] Retrieved from the Internet:<URL:http://www.riolabs.com/downloadables/news_events?RioTrade_aTechnical_Pe_CAD.pdf, pp. 1–9.

Overcoming the Hurdles of Business–To–Business Transaction Integration. Whitepaper [online], RioLabs, Inc.,Jan. 2001.[Retrieved on Jun. 1, 2001] Retrieved from the Internet:URL<:http//www.riolabs.com/downloadables/news_events/Overcoming_The_Hurdles_6_4F.pdf, pp. 1–7.

RioTrade: Technology to Rapidly Integrate Trading Partner Transactions. Whitepaper [online], Jan. 2001. [Retrieved on Jun. 1, 2001]Retrieved from the Internet:<URL: http//www.riolabs.com/downloadables/news_events/RioTrade2_Odata%20Sheet$_{13}$ 974.pdf, pp. 1–2.

RioTrade: Commerce One Support Overview. Whitepaper [online]. [Retrieved on Jun. 1, 2001] Retrieved from the Internet:<URL:http//www.riolabs.com/downloadables/news_events/RioTrade_CommerceOne_Su$_{13}$ A56.pdf. Pp. 1–2.

Riotrade: BizTalk Server 2000 Support. Whitepaper [online] [Retrieved on Jun. 1, 2001] Retrieved from the Internet:<URL:http//www.riolabs.com/downloadables/news_events/RioTrade_BizTalk_Server_29, pp. 1–2.

RioTrade: EDI Product Overview. Whitepaper [online]. [Retrieved on Jun. , 2001] Retrieved from the Internet:<URL:http//www.riolabs.com/downloadables/news_events/RioTrade_EDI_Overview_6.4j.pdf, pp. 1–2.

* cited by examiner

- <AuthorsXML>
 - <Author>
    <address>10932 Bigge Rd.</address>
    <au_fname>Johnson</au_fname>
    <au_id>172-32-1176</au_id>
    <au_lname>White</au_lname>
    <city>Menlo Park</city>
    <country>USA</country>
    <phone>408 496-7223</phone>
    <postalcode>94025</postalcodes>
    <state>CA</state>
  </Author>

XML PRESENTATION OF GENERAL-PURPOSE DATA SOURCES

This patent application is a continuation-in-part patent application of application Ser. No. 09/798,572 filed on Mar. 2, 2001, which claims priority and benefit under 35 U.S.C. 119(e) to U.S. Provisional Application No. 60/186,552 filed on Mar. 2, 2000, which is hereby incorporated by reference.

COPYRIGHT NOTICE

Contained herein is material that is subject to copyright protection. The copyright owner has no objection to the facsimile reproduction of the patent disclosure by any person, as it appears in the Patent and Trademark Office patent files or records, but otherwise reserves all rights to the copyright whatsoever.

BACKGROUND OF THE INVENTION

1. Field of the Invention

The invention relates generally to software that allows users and applications to communicate and interact with one or more general-purpose application-accessible data sources, and to a method of using the software. More particularly, embodiments of the invention relate to a simplified and intuitive means of accessing, presenting, manipulating, and modifying data associated with the one or more data sources, such as databases or database management systems (DBMSs).

2. Background of the Invention

Businesses frequently use databases to store critical business information. For example, a business may use a database to store information about employees, clients, products, sales, inventories, and other information. Very often, the businesses rely upon the databases to perform normal business operations, and easy and efficient use and updating of the databases is critical to business success.

Additionally, using and updating databases is frequently neither easy nor efficient. Frequently, databases are equipped with special software, called a database management system (DBMS), to enhance the ease of use and efficiency of using and updating the database. However, even with a DBMS, using and updating the database still requires programming skills, such as knowledge of a specialized database access language. For example, considering an Oracle ODBC database, available from Oracle Corporation of Redwood City, Calif., communication with the database requires knowledge of Structured Query Language (SQL). Although SQL is a de facto standard for databases, non-database programmers seldom know this language. Consequently, many small businesses without dedicated database programmers, and less-technical users of larger corporations cannot take full advantage of the potential wealth of information available in the databases.

Unfortunately, many businesses have multiple databases of different types. Accordingly, using and updating enterprise data frequently requires specialized knowledge of not one, but multiple database languages. This makes it very difficult and inefficient to use and update these databases for routine and day-to-day business operations. Importantly, this is a significant impediment to data integration within an organization or between business partners. Ultimately, many businesses recognize the shortcomings of this legacy-database approach, and periodically scrap the older databases and upgrade to a consistent format. Such drastic actions are time consuming, expensive, and undesirable.

Accordingly, there is a need in the art for a means of accessing, presenting, and manipulating data from databases that reduces the technical barriers currently associated with such activities. There is further needed a means that allows businesses to better access, present, and manipulate data residing in different types of databases.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Figure 1:
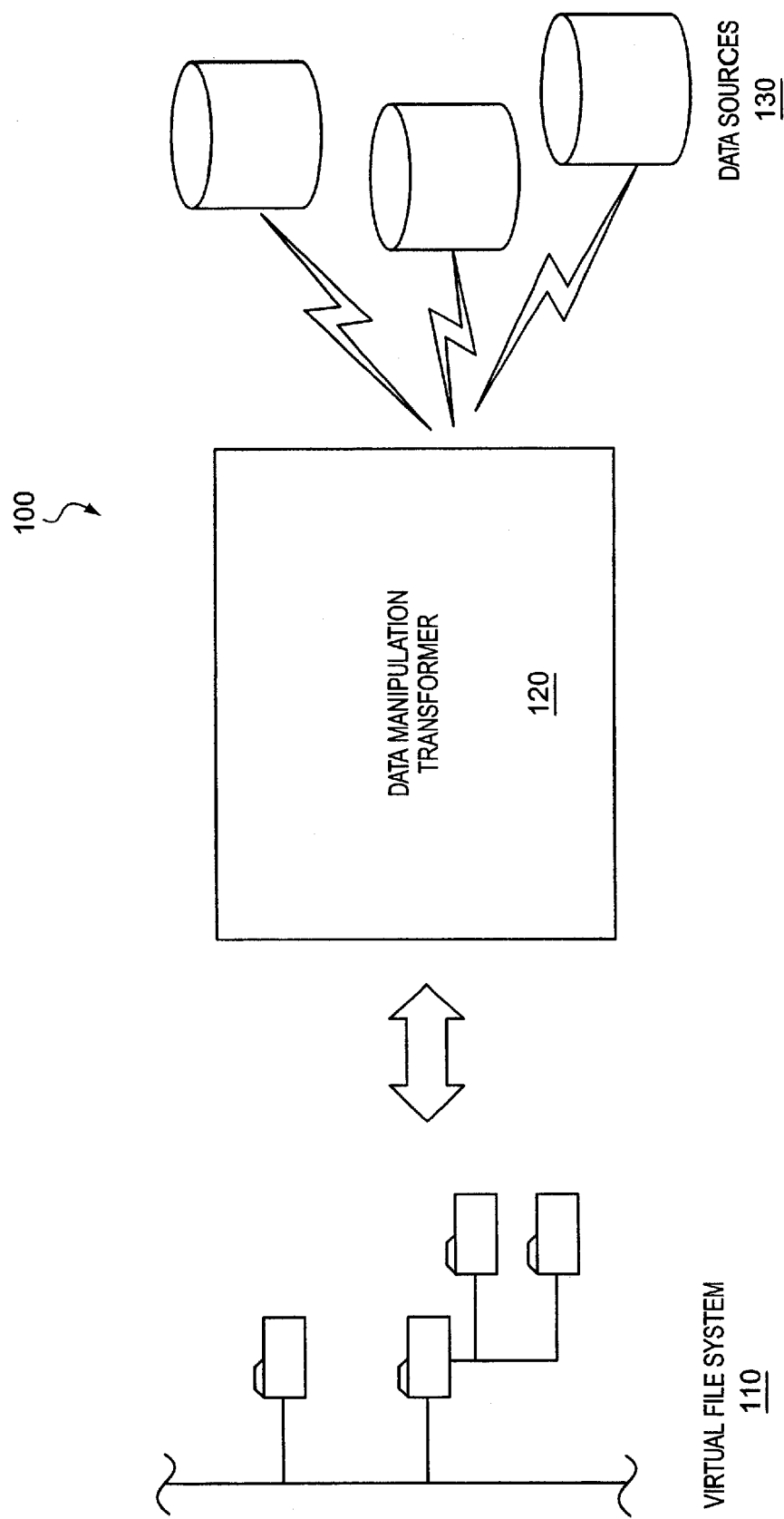
FIG. 1 conceptually illustrates the relationship between data sources and a virtual file system, according to one embodiment.

Methods and apparatus are described for accessing, presenting, and manipulating one or more types of potentially disparate data sources. Broadly stated, embodiments of the invention seek to simplify user interaction with local and/or remote data sources, such as database management systems (DBMSs).

According to one embodiment, one or more general-purpose, application-accessible data sources may be accessed and presented to a user through a virtual file system (VFS) that includes an interface that resembles an existing user interface paradigm in function, use, and appearance. Information is accessed regarding the structure of the data sources. The structure is then transformed into a predetermined hierarchical representation and presented as the VFS. By way of illustration, multiple data sources may be represented as a single VFS similar to a standard file system like the Microsoft Windows® Explorer file system, available from Microsoft Corporation of Redmond, Wash., or to another widely known file system. That is, the VFS may be a hierarchical visual file system, comprises of folders and files. The folders and files may correspond to disparate database systems, including remote networked database systems of different corporations. Given such a representation, data discovery across disparate database systems may be accomplished by performing standard navigation operations that are commonly associated with existing user interface paradigms. Although in other embodiments, file systems that are not similar to the Explorer file system (e.g., not visual) may be used.

According to another embodiment manipulations or other operations on the data sources may be performed in response to manipulations or operations on the interface paradigm of the VFS. For instance, read, write, join, and other manipulations may be performed. Typically, the manipulation or operation on the data sources includes receiving a VFS request, indicating a desired interaction or manipulation with the data sources, interpreting and translating the VFS request, and issuing corresponding appropriate instructions or data manipulation language to the data sources. The VFS request may be a user or application generated predetermined manipulation of a VFS representation of one or more disparate geographically distributed networked data sources. The VFS request is then interpreted, such as by existing coded interpretation instructions, and translated, such as by existing coded translation instructions, which may be different for different data sources, and issued to the data sources. For example, a join of two database tables having a common field, from two different data sources, may be performed by moving two files into a common folder, in an Explorer-like paradigm VFS. Corresponding results, if any, may also be received and presented via the VFS. Advantageously, in this manner, users that are familiar with standard file system concepts and functions can immediately and intuitively begin to manipulate the data sources without programming or having specialized database knowledge. Thus, database data can be accessed and utilized without the technical hurdles commonly associated with database technology.

According to another embodiment data may be dynamically transformed or reformatted into alternate presentation formats that may be accessed by users or applications. For example, the data may be dynamically transformed into comma-separated values (.csv), HyperText Markup Language (.html, .htm), text (.txt), and other data formats. This avoids creating a copy of the data that requires additional storage and becomes out of sync, since data is not extracted from the database into a copy, but rather is as current as the user desires it to be, because it may be refreshed each time it is accessed or according to a setting or other criteria.

In one embodiment, the data may be refreshed each time the data is accessed using an on-demand cache. A request is received to open a file corresponding to a subset of data from one or more application-accessible data sources. If the requested data exists in the cache and meets a predetermined freshness threshold, then the results are provided directly from the cache without accessing the data source. Otherwise, if the data does not exist in the cache or does not meet the predetermined freshness threshold, then the request is dynamically transformed into one or more queries appropriate for the data sources, the queries are issued against the data sources, and the results are received. In any event, the results are transformed into a format compatible with the file format of the opened file. In another embodiment, the data may be refreshed before it is needed, or as specified, using a pre-fetch cache. Information regarding the current structure and data associated with one or more application-accessible data sources is cached by periodically issuing queries against the data sources according to a user-specified data refresh interval and storing the results in the cache. Data is retrieved from the cache in response to an open-file request issued against the VFS, and the data are dynamically transformed into a format that is compatible with the file format of the opened file. According to a fifth embodiment, the VFS is used to generate an Extensible Markup Language (XML) file. First, a VFS is used to represent the structure of one or more application-accessible data sources. For example, folders may be used to represent different tables in a data source having a relational format. Then, optionally, the composition, organization, or structure of the VFS may be modified. After any optional modifications, XML formatted structure or data in XML format may be generated based on the VFS. The XML structure has a hierarchical representation mirroring the hierarchy of the VFS, and data element delimiters, such as tags, defining the beginning and end of each data element. Typically, names of the data element delimiters are based upon names of the VFS files or folders, which are also typically based on names from the data sources, such as table names in a relational database.

For convenience, embodiments of the invention will be described with reference to a standard interface paradigm VFS representation of data sources similar to a Microsoft Windows® Explorer file system interface paradigm in a Microsoft Windows® operating system environment, since this is well-known to many users and is useful to illustrate certain embodiments of the invention. However, in other embodiments non-visual and non-standard operating systems may be used. Additionally, various other existing or future interface paradigms may be employed, such as the Palm OS®, available from Palm Computing, Inc. of Santa Clara, Calif., a web page presentation format, interactive voice response (IVR) systems, and the like. Therefore, embodiments are not limited to any particular type of user interface paradigm or operating environment. In addition, while embodiments of the invention are described with reference to database management systems (DBMSs), the other embodiments are equally applicable to other types of data sources. Exemplary types of data sources include Open Database Connectivity (ODBC), Messaging Oriented Middleware (MOM), Independent Database API (IDAPI), HyperText Markup Language (HTML) tables, Electronic Data Interchange (EDI), Extensible Markup Language (XML) files, Java Database Connectivity (JDBC), spreadsheets (e.g., Microsoft® Excel), delimited text files, fixed-width text files, SQL tables, and other types of application-accessible structured data sources.

Embodiments of the invention simplify retrieval of data from one or more potentially disparate data sources by providing a uniform means to access, present and manipulate data associated with the data sources. Advantageously, embodiments of the invention may reduce the technical barriers currently associated with manipulating data from a group of heterogeneous relational databases.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Other features of the present invention will be apparent from the accompanying drawings and from the detailed description that follows.

The Virtual File System and Data Manipulation Transformer

FIG. 1 shows a system 100 for accessing, presenting, and manipulating data, according to one embodiment of the invention. The system includes a virtual file system (VFS) 110 communicating and interacting with a Data Manipulation Transformer (DMT 120) 120 that communicates and interacts with one or more potentially heterogeneous data sources 130. As shown, according to one embodiment, the DMT 120 is functionally disposed between the VFS 110 and the data sources 130, and may have certain characteristics of a driver or other middleware. In one embodiment, the DMT 120 may be written in a combination of a C++ language and Java, where the Java may be used to provide portability to diverse computer systems.

The term "data sources" is to be interpreted broadly to include all sources of application-accessible, structured, and formatted data, including relational and non-relational databases, EDI, mainframe data files, XML files, enterprise resource planning (ERP) packages (e.g., SAP, Great Plains), and similar sources. Additionally, communicating or otherwise interacting with a data source may include communicating or otherwise interacting with drivers, middleware, database management systems (DBMSs), and other components that expressly or traditionally accompany the data source.

The term "virtual file system" refers to a virtual representation of the structure and/or data in the data sources 130 that is capable of presenting data from the data sources 130 and receiving manipulations or operations that may be understood as corresponding manipulations and operations on the data sources 130. The VFS 110 may use a hierarchical data structure comprised of nodes corresponding to folders or files.

The term "folder" is to be interpreted broadly as a logical container, such as a data container, to organize other elements of the VFS 110 and may either contain other folders, files, or data. For example, a folder may be a directory or a visual organizational element, such as the visual folders in the Microsoft Windows® Explorer file system. Accordingly, the term folder includes directories in DOS, visual folder icons in the Explorer file system, data delimiters or tags in XML, and other logical containers. The folders may be used to create a hierarchy, such as a tree or inverted-tree structure in which a root logical container includes any number of sub-root logical containers and any number of files. This hierarchy may be applied recursively. Folders may store organizational information, such as information on sub-folders and files, may store information required to manipulate the folder (e.g., security controls), may store information regarding the type of data source the folder relates to or the type of query language used to obtain data from the data source, and other information. The term "file" refers to any application-accessible data and may include the aforementioned XML data. Broadly interpreted a file may be a logical collection of bytes with an assigned name. A file may be data or a subset of data from one or more database tables and in a particular format.

The VFS 110 provides a simplified and intuitive way of interacting with the data sources 130. In one embodiment, the VFS 110 may be used to reflect and expose the internal structure of one or more of the data sources 130. The structure may be any characteristics that describe the data in the particular type of data source, such as how the data is organized into categories, subsets, rows, columns, tables, the formats of the data (e.g., types and lengths), hierarchical or other relationships to other data, and other structural information. The structure may describe a relational database. A relational database is a database with subsets of data stored in objects, such as tables or files. Tables contain data arranged in rows and columns. Frequently, the rows represent records or data about separate objects or items, and the columns represent fields or particular attributes or characteristics of a record. The tables of data may have keys, such as primary keys, that allow data from different tables to be compared. For example, a common field employee identification number may relate a first table containing home mailing address to a second table containing human resources benefit elections. This key may allow comparison of these tables. Accordingly, for a relational database, the structure may include the type of relational database, how the data is arranged in tables, the number of rows and columns, data formats, and other information. For example, in response to navigating into a folder representing a particular database, software may access structural information regarding the internal structure of the database (e.g., information regarding database tables), transform the internal structure into a predetermined hierarchical representation, and cause the internal structure to be presented in the context of a single VFS 110 as a subdirectory structure of the folder. The VFS 110 may also reflect changes to the structure of the data sources 130 and other changes. For example, addition of a new table to a data source may cause a representation of the table to be added to the VFS 110.

Modification of the VFS 110 may result in access, modification, or presentation of data from the data sources 130. The cause of modification of the VFS 110 is not a limitation of certain embodiments of the invention, since this will frequently depend on the environment of use. According to one exemplary embodiment, a user may modify the VFS 110 by performing a predetermined set of operations. According to another embodiment, an application may directly modify the VFS 110 or may send a message that is understood or may be interpreted by existing logic or instructions as a predetermined manipulation of the VFS 110. Typically, the application will want to use data from the data sources 130, although in other cases the application could be an application associated with the data sources 130 that wants to provide the data, such as by "pushing" the data to another user or application. For example, in the later case, the data source may push data to other users or applications according to criteria, such as a time schedule, when the data changes, or based on other criteria appropriate for the intended use. In any event, the user or application may cause a modification of the VFS 110 that results in a VFS 110 request being sent to the DMT 120. In one embodiment, modification of the VFS 110 prompts the file system to identify and turn control over to software to generate the request to the DMT 120. In general, the amount of dependence of the VFS 110 and DMT 120 on the operating system and file system may depend on the desirability of reusing operating or file system code, and market or implementation details like whether multiple operating system are to be supported. Varying levels of dependency are contemplated.

The DMT 120 receives or observes an indication of operations on the VFS 110, such as changes or modifications of the VFS. In one embodiment, following modification of the VFS 110, the VFS 110 works with a file system to send a file system request consistent with the modification of the VFS 110 to a DMT 120 that has an interface to receive the file system request and is able to further process the request via interpretation and transformation instructions. The DMT 120 receives the predetermined one or more requests (e.g., requests to open a file, close a file, read a file, write a file, query directory contents, and globally update or delete), interprets the requests, accesses stored descriptive information about the target data sources 130 (e.g., data manipulation language and network location information), transforms the requests into a data manipulation language appropriate for the target data sources 130, and issues the transformed request against the appropriate databases. In this way, the data manipulation language may be automatically generated or code-generated, rather than being generated manually or by computer or database programmers. The term "data manipulation language" refers generally to a language or set of commands that may be used to query, insert data into, restructure, update, modify, or otherwise operate on an application-accessible data source, such as a database. In the context of relational databases, Structured Query Language (SQL) is the de facto standard for such manipulations and represents an example of a data manipulation language, although others are possible, including XML, ODBC protocol, and others.

According to one embodiment each supported interaction with the data sources 130 is triggered by the DMT 120 receiving a predetermined one or more VFS requests. For example, a join operation may be defined or specified by a first manipulation of the VFS 110 and then an actual access to the data sources and the data be implemented by a second manipulation of the VFS 110. A join operation in relational databases generally refers to an operation that matches records in two or more tables based on a common field. For example, the DMT 120 may infer a join operation when it receives multiple file system requests corresponding to the following operations: (1) creating a folder in the VFS 110 (2) copying a first file (or folder containing a file) into the created folder, and (3) copying a second file (or folder containing a file) into the created folder. These operations may be sufficient to specify a join operation comprising potentially heterogeneous data manipulation language appropriate for the data sources involved in and specified by the join operation including accessing additional data or metadata corresponding to the data sources and using it to formulate or specify the join operation. For example, one may be in SQL and another may be in EDI, any fourth-generation language (4GL), or in some other language. The join operation may indicate a particular database, a particular table, provide a matching condition to apply against the data, and indicate which fields of data are to be included in the result. Typically, the join operation is written as a SELECT query, such as SELECT ALL WHERE NAME= "JONES" AND AGE>62, that is issued against one or more data sources 130 having the same or different types. In this way, the VFS 110 may represent, store, and preserve the specification of the join operation. Then, when a typically different manipulation of the VFS 110 occurs, such as a selection of the created folder indicating a demand for the join data, the DMT 120 may responsively issue the specified join operation on the data sources to provide a concatenated set of data corresponding to the specified join. Then, at some later time, the created folder may be selected again to create an up-to-date concatenation of the data that reflects the current state of the data sources and the data. Advantageously, this representation provides a simple and convenient dynamic or live link to the data sources so that join data may be obtained in real time from the data sources, which avoids unlinked copies of the data that easily become dated and unreliable.

Each of the data sources 130 associated with the data request return database information to the DMT 120, typically in the native formats supported by the data sources 130. Rather than actual data, pointers or other means to logically connect folders in the VFS 110 with data in the data sources 130 may be used. This may prevent copies of the data from being out of sync with the data sources 130 and may reduce storage requirements. The DMT 120 receives the data, translates the data into a form that is appropriate for presentation in the context of the VFS 110, and issues the data to the VFS 110. Other applications, such as report writers to analyze the data or create customized charts, may then be used.

As discussed above, according to one embodiment, multiple potentially heterogeneous data sources 130 may be accessed via the VFS 110 through the use of middleware software between an operating system and the multiple potentially heterogeneous data sources 130. Thus, data discovery across disparate database systems may be accomplished by performing standard navigation operations that are commonly associated with standard interface paradigms and user interfaces for file systems. For example, in a Microsoft Windows® Explorer environment, data discovery may be easily and efficiently performed by opening folders and files of the VFS 110 representation. Likewise, data manipulation may comprise simply combining folders and performing other intuitive operations on the VFS 110. Advantageously, such operations are typically simpler than directly modifying several heterogeneous data sources 130, by issuing multiple database queries in different query languages. Thus, the VFS 110 displaces the complicated language-based manipulation of databases with an easy, efficient, and intuitive interface paradigm that may be well known to most computer users. Advantageously, this allows data stored in different formats, including DB2, IMS, Ingres, Microsoft SQL Server, Oracle, VSAM files, and other formats, to be presented and accessed by way of a single interface paradigm, such as the VFS, without the users knowing, and without the penalties that previously existed because they were in different formats. This may benefit data integration within a business and between business partners.

Figure 2:
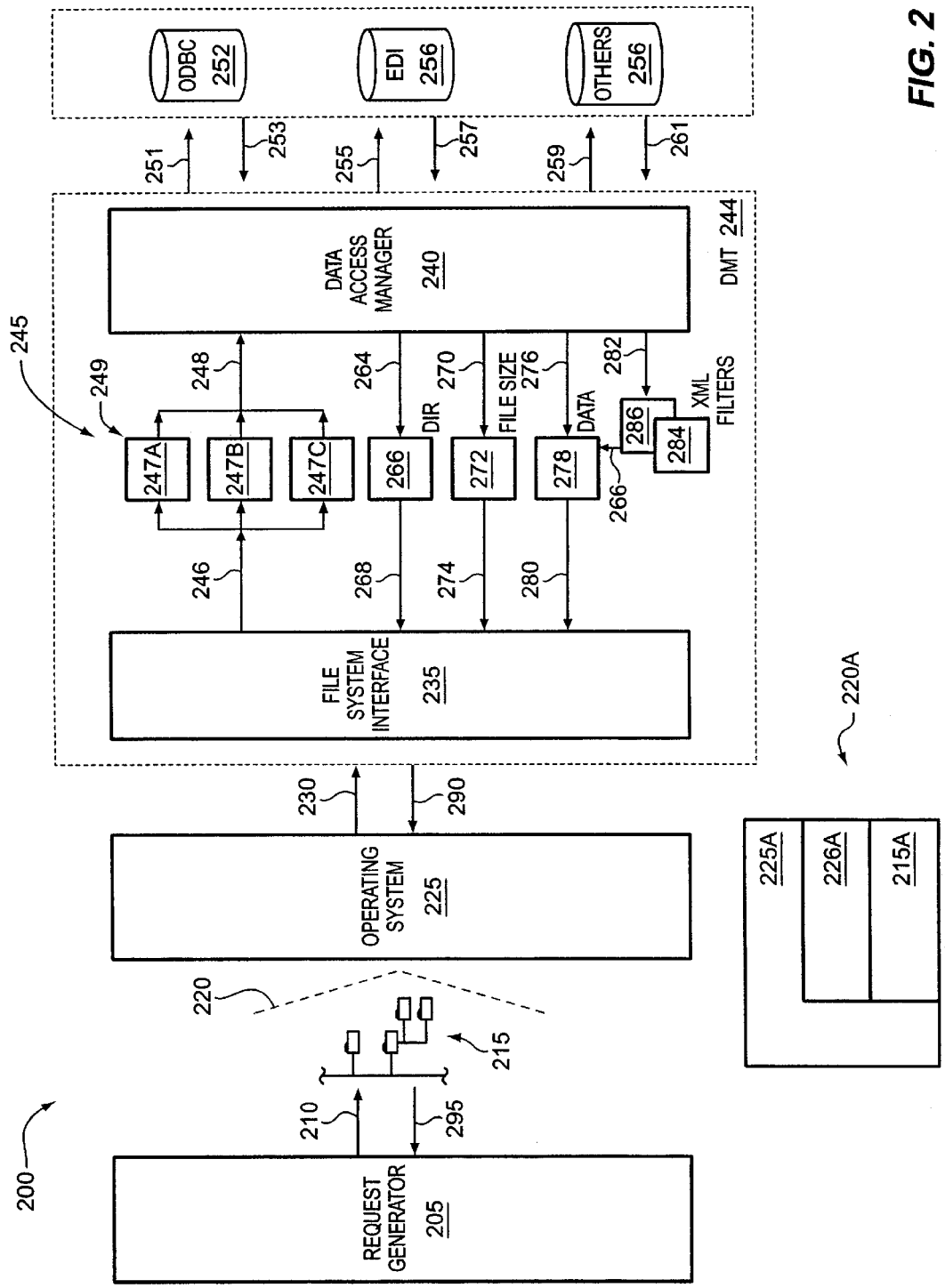
FIG. 2 conceptually illustrates a system in which a request generator interacts with data sources using a virtual file system, according to one embodiment.

FIG. 2 shows a system 200 for interacting with one or more potentially heterogeneous data sources 250, according to one embodiment. A request generator 205 issues a VFS request 210 and receives a VFS response 295 based on an interaction with the one or more potentially heterogeneous data sources 250. The request generator 205 and the VFS request 210 are to be interpreted broadly to include any request generator 205 and VFS request 210 that can generate a request that indirectly indicates and can be interpreted as an access, manipulation, or other operation on the data sources 250. In certain embodiments the request generator 205 may be a computer system and the VFS request 210 may be any type of message, communication signal, protocol, or format, such as an analog signal, an HTTP or XML request, or any other input that existing instructions could interpret as a manipulation of a VFS 215. In cases where data is written to the target data sources 250, the VFS request 210 may contain or indicate the data to be written to the data sources 250. Alternatively, the request generator 205 may be a user or data input device (e.g., keyboard, mouse), and the VFS request 210 may be a selection or data input by the computer data input device.

Typically, the VFS 215 has an association 220 with an operating system 225. The operating system 225 may provide a graphical user interface (GUI), such as pull-down menus. GUIs typically include a moveable symbol to select objects and commands (e.g., a cursor) that is positioned in response to input from a cursor control device (e.g., a mouse or trackball), and a plurality of icons to represent commands, files, or windows. The graphical user interface may also include an area of the display screen containing a plurality of icons (e.g., a desktop), functionally different areas of the display screen (e.g., windows) and menus to display commands in a structured and ordered format. For example, a user may use a mouse to move a pointer over an icon representing a database file, select the icon with the mouse, which may cause a window corresponding to the database file to open on the desktop. Alternatively, the operating system 225 may provide a command-driven shell or user interface, such as in DOS and UNIX, in which the operating system is accessed with syntactical expressions or commands. The operating system 225 may also host shells to allow for multiple user interfaces, for example to provide a command-driven interface in a Windows operating system. Frequently, the VFS 215 will be discussed in the context of the well-known Microsoft Windows® operating system, however the invention is not limited to any particular operating system 225. Accordingly, embodiments of the invention are equally applicable to DOS, OS/2, UNIX, Linux, Palm OS®, interactive voice response (IVR), and other operating systems.

Typically the operating system 225 uses a file system, which is an operating system component that manages information on a storage device, such as a hard drive. The file system may present a list (or table) or a group of nested lists, which may be functionally or logically linked to files. The file system may be either a visual GUI-based file system or a command-driven file system, to assist in managing information storage, such as cataloging files on a hard drive. File systems typically include folders and files. The file system may not need to know about the type of information in files, although it may know a name, a memory location, time stamp information, size information, and security information. Some directory-based file systems, use files with special organizational characteristics to achieve the directory structure and organization. For example, a directory may be a table file with information about subdirectories and files it contains and links to where the file or subdirectory data begins in a memory allocation unit. However for simplicity these items will be referred to as folders, since the primary function is to organize other files. File systems may also be provided or supplemented by applications, such as file management applications, which may be used to add backup procedures and file protection to traditional file systems. Exemplary file systems that may be used for implementation on personal computers include HPS, file allocation table (FAT), FAT32, NT file system (NTFS), high-performance file system (HPFS), and other file systems.

According to one embodiment 220A, the operating system 225A includes a file system 226A and the VFS 215A is connected with the file system 226A in a way that makes use of the VFS 215 similar to use of the file system 226A. For example, manipulation of the virtual file system 226A representation may be sufficiently similar to a corresponding manipulation of an actual file system 226A that is used to manage disk storage.

The file system 226A and the VFS 215A interact to send a file system request 230. Typically, the VFS 215 is manipulated by or in response to the VFS request 210, and the manipulation causes either the VFS 215, the file system 226A, the operating system 225, or some combination, to automatically issue the file system request 230. The exact relationship may depend on the nature of the operating system, the file system, and the VFS. In one embodiment, the file system 226A receives an indication of a modification of the VFS 215A and delegates control to software that processes the modification and generates the file system request 230. In one particular embodiment, a conceptually layered file system is used that includes a top layer to determine which sub-part of the file system to process the request. It may do this based on a qualified file name. For example, the file system may be a Microsoft Windows based file system where an interaction with the A: part of the file system would be processed by the floppy file system, and an interaction with an R: part of the file system would be processed by software associated with the VFS 215A, such as a device driver. The software or device driver may generate an appropriate file system request 230, consistent with the VFS modification, and send the request 230 to a data manipulation transformer (DMT) 244 to solicit or drive the services of the DMT 244. Typically, such features where control is passed via the file system to the described software may be more extensible than designs based on software receiving the request before the file system, although both approaches are contemplated.

The file system request 230 will typically be a message sent from the software or device driver used to implement the VFS as part of the file system to the DMT. The file system request 230 may be in a form similar to other standard file system requests. Typically, the file system request 230 will include a type of the request (e.g., directory listing, read, write, file size) and a path specification of the desired file that may be resolved to a particular set of data (e.g., a table) in a particular database. Other information may also be included, such as indication of a data source, indication of an appropriate data manipulation language compatible with the data source, an indication of or data to be written to a data source, and other information. The details of the DMT 244, according to one embodiment, will be explained more fully below.

The DMT 244 receives or observes the file system request 230. The DMT 244 is capable of interpreting the file system request 230, translating the file system request 230 into data manipulation language appropriate for the target data sources 250, and issuing the language as a request to at least one of the data sources 250. This may include analyzing and processing a path specification in the file system request 230. The DMT 244 may support one or multiple operating environments, including Windows, Windows NT, Unix, Solaris, SunOS, Linux, and others. Typically, a DMT 244 that supports multiple environments will have more code, such as code to interpret different file system requests 230. Typically, the DMT 244 interprets the file system request 230, and generates and issues at least one request appropriate for one or more potentially heterogeneous data sources 250. The appropriate request may be in a predetermined format, protocol, or data manipulation language. In particular, three such requests are shown, including a first request 251 appropriate for an ODBC data source 252, a second request 255 appropriate for an Electronic Data Interchange (EDI) data source 256, and a third request 259 appropriate for another data source 260 of unspecified type. EDI is an electronic communication of data (e.g., business orders, confirmations, invoices) that allows direct computer-to-computer transactions into databases and ordering systems. Several standards of EDI may be supported, including ANSI X12 and EDIFACT. Although not shown, the discussed data sources 250 may include drivers or other middleware to facilitate interaction with the actual data. For example, the ODBC data source may include an ODBC driver available from the database vendor. In response, the ODBC data source 252 sends a response 253 corresponding to the first request 251, the EDI data source sends a response 257 corresponding to the request 255, and the other data source sends a response 261 corresponding to the request 259. Typically the responses 253, 257, and 261 will be in the native formats or languages of the data sources 250 (e.g., EDI for EDI data source 256).

The DMT 244 receives the responses from the data sources 250 and generates and sends a file system interface (FSI) response 290 corresponding to the one or more responses. According to one embodiment, the DMT 244 interprets the responses, transforms data associated with the responses into one or more predetermined formats compatible with the operating system 225 and the VFS 215, and sends the FSI response 290 to the VFS 215. Transforming may include transforming into an intermediate common format and then performing other operations, such as joining or concatenating data from multiple data source responses. Transforming may also include transforming into multiple different formats compatible with applications such as word processors (e.g., Microsoft® Word) spreadsheets (e.g., Microsoft® Excel), browsers for HTML and XML formats (e.g., Microsoft® Internet Explorer, text editors (e.g., Microsoft® Notepad), and others. The data in these formats may then be communicated in the FSI response 290. Based on the FSI response 290, the VFS 215 may present or send a corresponding VFS response 295 to the request generator 205. As discussed above, the response 295 has the same freedom and broad interpretation as the request 210 and can include visual display, a message send to other applications, and others.

File System Interface and Data Access Manager

According to one embodiment, the DMT 244 may conceptually or functionally include a file system interface (FSI) 235, to interface with the file system 226A, and a data access manager (DAM) 240, to interface with the data sources 250.

The FSI 235 acts as a gateway between the operating system 225 and the DAM 240 by interacting with both. Typically the FSI 235 conforms to the operating system 225, is registered with the operating system 225, and uses formats supported by the operating system 225. The FSI 235 may issue any type of request desired for the particular application, including requests that the DAM 240 perform database operations, request reading or writing data to a data source, request file system information from a data source, request file size information, and others. For example, the FSI 235 may provide callbacks corresponding to operating system requests, interpret incoming operating system requests and communicate the requests to the DAM 240, receive responses (e.g., data) from the DAM 240, set appropriate status response information expected by the operating system 225, supply data to the operating system 225 in a format conforming to the operating system 225, and perform other desired tasks.

Upon receiving a file system request 230, the FSI 235 may transform the file system request 230 into one or more queries or messages 246, consistent with the file system request 230, and send the queries or messages 246 to the DAM 240. Information in message 246 may include an indication of a particular relational database, a table in the relational database, and certain data elements (or criteria to determine the data elements) in the table.

In one embodiment, the FSI 235 may interpret the file system request 230 to identify a path specification and use a data structure to transform the path structure, and other information, into the one or more queries. The data structure may be an in-memory tree structure corresponding to the VFS hierarchy. The FSI 235 may locate a node on the tree that corresponds to the path specification in the file system request 230. Then, when the corresponding node is located, information associated with that node is use to compose the query and send the query to the DAM 240. Results returned by the DAM 240 may also be formatted according to information also associated with the node. The formatted data may then be placed into buffers and returned to the operating system 225A, which may provide it to the request generator 205. The operating system may be provided a "file not found" message, in the event the data is not available or cannot be located. When request generator 205 includes a plurality of request generators, the FSI 235 may use a locking strategy to regulate access to data. The DAM 240 interacts with the FSI 235 and the data sources 250. Typically, the DAM 240 performs a majority of the operations responsible for accessing and presenting the data sources 250 as the VFS 215. For example, the DAM 240 may interact with one or more data sources 250, manage connections to the data sources 250, issue queries against the one or more data sources 250 to perform typical database operations (e.g., retrieve data), return results to the FSI 235, manage an internal data structure corresponding to the VFS 215, and perform other desired operations. Frequently, these tasks are performed in response to FSI requests 246. In some embodiments, the DAM 240 may be implemented as an application, such as a user-mode application or an application that interfaces with other applications.

According to one embodiment the FSI 235 includes a plurality of callback routines that are implemented in response to file system 226A operations or requests. An exemplary set of callback routines are shown as an Input Output Control (IOCTL) elements interface 245 that provides a structured communication that allows the FSI 235 and the DAM 240 to interact. The FSI 235 may include callback routines corresponding to file system 226A operations or requests, such as OpenFile( ), CloseFile( ), ReadFile( ), WriteFile( ), CreateFile( ), QueryDirectory( ), and others. Typically the format of this interface will derive from the operating system 225 and the FSI 235 will simply conform.

These callback routines may be implemented by the FSI 235 in response to or after a call to manipulate a virtual file. When a user or application initiates an operating system request the operating system 225 drives an FSI callback routine to handle the request. The FSI 235 may act as a passive component that does not initiate action without receiving a request from the operating system. OpenFile( ) may be used when the operating system 225 issues an open file request. For a join operation, CreateFile( ) may be called when the parent join folder is created to create a directory node in the VFS 215, CreateFile( ) may be called for each of the files in the source folder to create file nodes in the VFS 215, CreateFile( ) may be called for the second source folder to create a directory node in the VFS 215, and CreateFile( ) may be called for files in the second source folder to create file nodes in the VFS 215. As will be explained below, the DAM 240 may contain logic to recognize these as a particular join operation.

The file system request 230 may cause the FSI 235 to manipulate a set of internal data structures, request services from the DAM 240, or perform other operations. According to one embodiment, the FSI 235 creates and manages file control blocks (FCBs) to represent open file system elements (e.g., a directories and files) in response to the operating system 225 driving a callback routine. For example, when the operating system 225 drives an OpenFile( ) callback to open a file system element, the FSI 235 may create a FCB corresponding to that file system element. Once generated, the FCB block may be reused in subsequent open operations on the same element. The FCB may maintain a count of open file requests affecting that file system element. Each call to OpenFile( ) for file X causes the FCB use count for file X to be incremented, and each CloseFile( ) call for X causes the use count to be decremented. The FCB's storage may be deallocated when the use count becomes zero. The FSI 235 may maintain a list of active FCBs to facilitate management of the control blocks.

The FSI 235 also provides contexts for each user or OpenFile( ) operation. For example, assuming two users issue OpenFile( ) callback operations on the same file, one FCB will be generated, but two contexts will be created and associated with the FCB. The contexts contain state information about each user, including a file pointer location, which allows multiple users to read data from different byte offsets. The FSI 235 may maintain a list of active contexts for each FCB.

The FSI 235 and DAM 240 may use a structured communication mechanism to facilitate interaction. According to one embodiment, the FSI 235 and the DAM 240 communicate using the IOCTL interface 245. Command IOCTL (CmdIOCTL) are one type used to initiate a request on the DAM 240. For example, the DAM 240 may create a CmdIOCTL 247A, the CmdIOCTL may notify the FSI 235 of its existence and await a request from the FSI 235. The FSI 235 may send an FSI request 246, and the CmdIOCTL 247A may receive the request. After receiving the request, the CmdIOCTL 247A may reformat the request, including parameters of the request, into a DAM request 248. Accordingly, the CmdIOCTL may process a request from the FSI 235 into a request or call to the DAM 240. The FSI request 246 may correspond to various CmdIOCTL requests. Exemplary CmdIOCTL requests include a DirectoryCommand to request information about the contents of a virtual directory, DataCommand to request virtual file data, FileSizeCommand to request the size of a virtual file. Other requests are also possible, such as requests to write data. The CmdIOCTL may be used for subsequent requests from the FSI 235. According to one embodiment, the DAM 240 may create a plurality of CmdIOCTLs 249, such as 247A–C, to receive requests and prevent communication bottlenecks between the FSI 235 and DAM 240. In this and other ways, embodiments may provide support for multithreading and clustering. IOCTLs may be used to respond to the CmdIOCTL requests. For example, a Directory IOCTL (DirIOCTL) 266 may be used to respond to a DirectoryCommand by providing information about the contents of a virtual directory. The DirIOCTL may receive information 264 from the DAM 240 and present corresponding directory information 268 to the FSI 235. Similarly, FileSizeIOCTL 272 may be used to respond to the FileSizeCommand by providing the size of a virtual file. Likewise, DataIOCTL 278 may be used to respond to the DataCommand by providing the data of a virtual file (multiple DataIOCTL may be used for large virtual files). Other IOCTLs may be provided to correspond to file system 226A and FSI request 246 and support the desired interactions with the data sources 250.

According to one embodiment, one or more filters 284, 286 may be used to transform the data, such as by changing the data from one format to another. In one embodiment, the filters 284, 286 convert data in an internal format, such as a format generated by the DAM 240, into a byte stream recognized by the operating system 225 as a particular format. The internal format may be based on the data sources 250, such as XML, an ODBC-based format, or another internal format. The filters 284, 286 may be based on an XML Stylesheet Language Transformations (XSLT), which are used to convert an XML document into another XML document, an HTML document, a PDF document, or another type. XSLT may include an XML parser to separate XML elements into a tree structure, followed by an XSLT processor to transform or manipulate the tree structure. The filters 284, 286 may support a single internal format, which may make them simpler to code, or may support multiple heterogeneous formats. Filters 284, 286 may be provided to present or convert the data in any desired format, including: text (.txt), comma-separated value (.csv), hypertext markup language files (.htm, .html), extensible markup language (.xml), XML stylesheet language (.xsl), document type definition (.dtd), and others. As shown, one or more of the filters 284, 286 receive data 282, reformat the data, and issue the data to a data IOCTL 278. An XML filter 284 may be used to format the data in an XML-based format. According to one embodiment, XSL or DTD files may be specified to format XML files, or alternatively a default format may be used. Alternatively, the data may be formatted into any arbitrary format by another filter 286. Alternatively, the data could be passed from the DAM 240 to the FSI 235 in an internal format and subsequently converted to the desired format. This may be the case, for example, for directory information. The filters 284, 286 may also be used between the data sources 250 and the DAM 240, either serving a particular type of data source or multiple types, or between the FSI 235 and the operating system 225.

The discussion above pertains to one exemplary embodiment of the DMT 244 244. In other embodiments, the complexity and functionality of the FSI 235 and DAM 240 will depend on the implementation. For example, the complexity and functionality of the FSI 235 and DAM 240 may be different in a Business-to-Business (B2B) Internet environment compared to a computer system accessing enterprise information on a local computer network. The number of heterogeneous data sources 250 may affect the amount of conversion the DAM 240 supports. Likewise, the FSI 235 may support one or multiple types of operating systems. Those of ordinary skill in the art will recognize that many equivalents of the DMT 244 discussed above are contemplated for different implementations.

Exemplary Virtual File System

Figure 3:
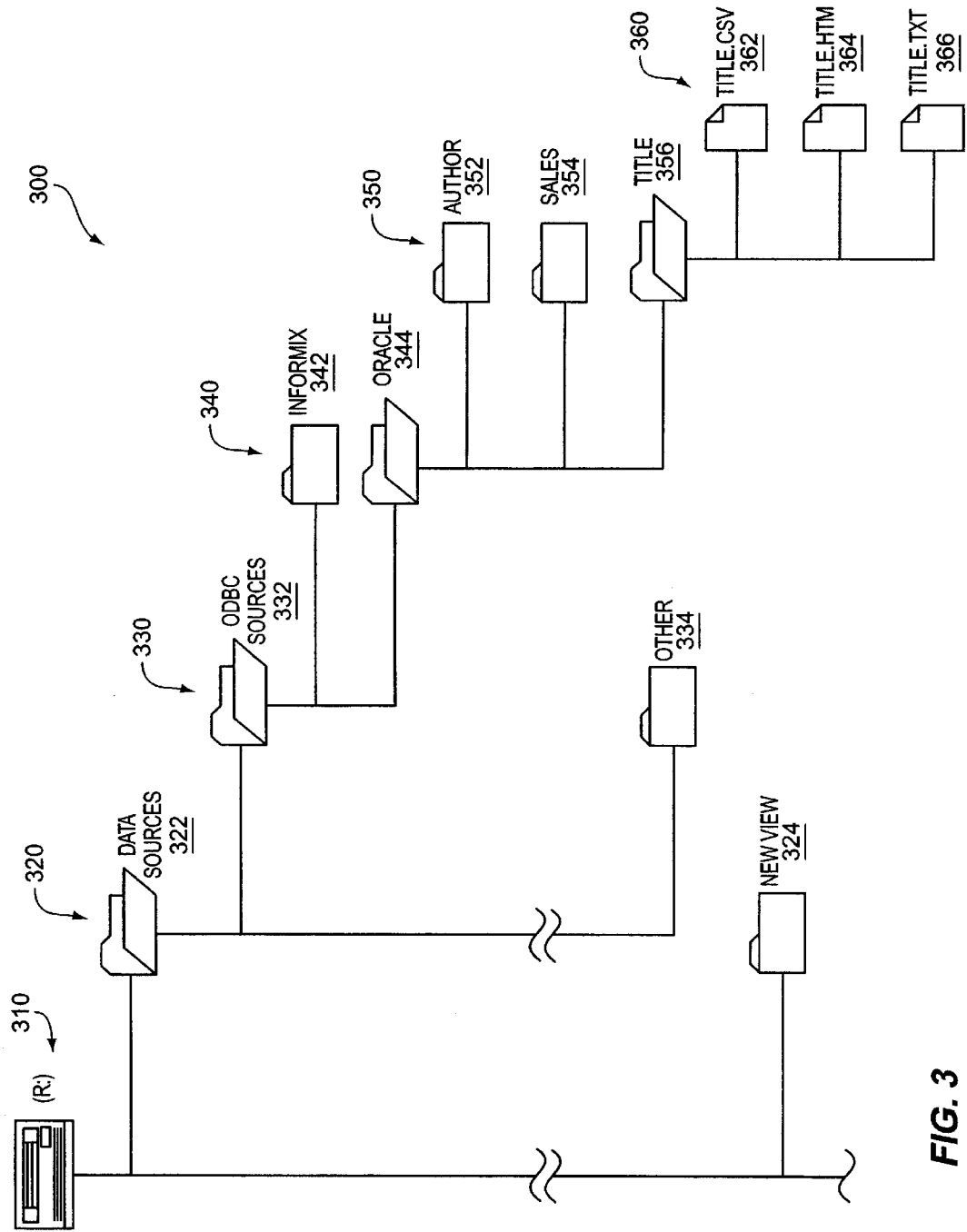
FIG. 3 conceptually illustrates an exemplary virtual file system, according to one embodiment.

FIG. 3 shows an exemplary VFS representation 300, according to one embodiment of the invention. The VFS representation 300 presents a VFS through an interface that is similar in appearance and/or use to the Microsoft Windows® Explorer file system. For example, the VFS representation 300 includes a set of folders that appear similar and respond correspondingly to actions (e.g., through a mouse) or commands that manipulate the Microsoft Windows® Explorer file system. For example, the VFS representation 30Q may respond in analogous fashion to drag-and-drop operations, and other operations used to manipulate the file system. Advantageously, this allows users trained on existing file systems to readily and easily use the VFS representation 300. The VFS representation 300 may be added or appended to the fie system, although other configurations are possible.

The VFS representation 300 is a hierarchical arrangement of nodes, where the nodes may be files or folders. The VFS representation 300 includes folders at each of a first level 310, a second level 320, a third level, 330, a fourth level 340, and a fifth level, and files at a sixth level 360.

The first level 310 of the VFS representation 300 is a root level or "R:" drive that represents and contains the VFS. As shown, the "R:" drive appears the same as other drives, such as the C: drive in a typical Microsoft Windows® Explorer file system. Beneath the root level are all the folders and files of the VFS representation 300.

The second level may be used to separate data discovery (e.g., determining which databases are available and what tables they contain) and new views, such as user or application-defined views of the data. As shown, the second level includes a data-sources folder 322 to indicate which data source types, data sources, and data content is available. The data-sources folder 322, subfolders, and/or files may be created automatically following registering or otherwise identifying the data sources and connections to the operating system. Registering may include specifying how to connect to the data source (e.g., a network address), identify or indicate a data manipulation language for the data source, and specify and store other desired information that may facilitate future interactions with the data source. By way of example, registering may include defining an ODBC data source name (DSN) using the ODBC Data Source Administrator tool located on the Windows Control Panel. This tool may be accessed by sequentially selecting, "start"+"settings"+"control panel"+"ODBC data". When the ODBC data source name is defined, a "database name" is added to the directory R:/data sources/ODBC sources/"database name". The data sources may be activated by right clicking on the folder, selecting properties, selecting database login, and selecting active. Equivalents for non-ODBC type data sources are also possible. Then, as will be explained further below, data content will be automatically represented in the VFS by adding other folders and files. Thus, in this particular implementation, the data-sources folder 322 and its directories and files are read-only, and represent the current state of the data sources. For example, if a table is deleted from one of the data sources, the folder for that table also disappears from the data sources directory. In this way, the data-sources folder 322 maintains a dynamic, live link to the data sources that reflects the current state of the data sources and is based on communication with the data sources. Each folder of the data-sources folder 322 is mapped to database tables (or other sets of data) and stored procedures, so that desired actions occur in response to manipulations of the VFS representation 300.

The second level also includes a new-view folder 324 to manipulate data from the data-sources folder 322 and may include custom views of data from the data-sources folder 322. For example, the new-view folder 324 may include, a database table copied from the data-sources folder 322, an alternate view or a subset of a database table (e.g., rows or columns) conforming to a particular user-specified selection criteria, a database join of two or more tables (either from the same or a different data source), or a view of database data presented in a different format, such as XML format.

According to this embodiment, creating custom views begins by first copying folders from the data sources directory into the new view directory, followed by any desired manipulations. According to one embodiment, these manipulations are possible even though the new-view folder 324 is read-only. The new-view folder 324 may also be used for other operations, such as write operations. For example, data may be written into a folder beneath the new-view folder 324 and subsequently used to update one or more of the data sources. In other implementations the new-view folder 322 may not be present, if only data discovery is supported.

In this example, the data-sources folder 322 has been selected (i.e., opened), and reveals a third level of the VFS hierarchy that presents different types of data sources. Contained within the data-sources folder 322 are the ODBC-sources folder 332 and the "other" folder 334. The ODBC-sources folder may contain any number of ODBC-compatible data sources. The other folder may be used for any type of non-ODBC, application-accessible, structured data sources, including Messaging Oriented Middleware (MOM), Independent Database API (IDAPI), HyperText Markup Language (HTML) tables, Electronic Data Interchange (EDI), Extensible Markup Language (XML) files, Java Database Connectivity (JDBC), and other types of application-accessible structured data sources. In addition to being useful for organization, the third level may also be useful for determining appropriate instructions to execute. For example, based on a folder being beneath the ODBC-sources folder, ODBC-compatible data manipulation language instructions may be used.

The fourth level of the VFS hierarchy may reveal vendor types of connections within each protocol type of data source. The ODBC-sources folder is selected or open. Contained within the ODBC-sources folder are an Informix folder 342 and an Oracle folder 344, although the folder could also contain any other ODBC-compatible type of connection. The Informix folder may contain folders and files associated with Informix data sources, and the Oracle folder may contain folders and files associated with Oracle data sources. Although not shown, additional folders beneath each folder at this level could be provided to organize based on other heterogeneity, such as whether the data source is contacted via middleware (e.g., custom enterprise software), a driver (e.g., ODBC driver), or another type. Beneath the un-opened "other" folder 334, there could be folders and files corresponding to any non-ODBC-type data sources.

The fifth level of the VFS hierarchy may expose the internal structure of a data source by presenting specific content of files, objects, or tables. In response to navigation into a folder representing a particular database, the DMT 120 may access information regarding the internal structure of the database (e.g., information regarding database tables), transform the internal structure into a predetermined hierarchical representation, and cause the internal structure to be presented in the context of the VFS as a subdirectory structure of the folder. As shown, the Oracle folder is selected and contains an author folder 352, a sales folder 354, and a title folder 356. A folder may be provided for each data table or content. The author, sales, and title folders may contain relational database tables related to authors, sales, and titles, respectively.

At the sixth level, data content may be presented in one or more common file formats. The files may be opened using standard or custom applications that are suitable for interpreting and displaying the associated file format. In this example, the title folder 356 is selected and contains three files with different formats. A title.csv file 362 represents data in a comma-separated value format, suitable for Microsoft® Excel and other computer programs, a title.htm file 364 represents similar data in a hypertext markup format, suitable for Microsoft® Internet Explorer and other browsers, and a title.txt 366 file represents similar data in a text file format, suitable for Microsoft® Notepad. Other files and formats are contemplated.

The VFS representation 300 may be configured using Microsoft Windows® Explorer's property pages. Within the Microsoft Windows® Explorer interface, the property pages may be accessed through the folder properties window. Then the property pages may be created or modified to perform logging into a database, configuring data size and refresh rates, specifying data selection criteria (e.g., join information), selecting a subset of rows and/or columns, modifying a column, defining an XML representation or schema, and perform other operations.

Although FIG. 3 has discussed a VFS representations 300 that is similar in certain features to the Microsoft Windows® Explorer interface paradigm, this is only one exemplary representation of the VFS, and many other representations, including representations that are substantially different from such standard interfaces, are contemplated. For example, one alternate VFS representation is not visually-based and responds to commands rather than interactions through a GUI. Additionally, the VFS itself is to be distinguished from any particular representation or interface to it, such as the representation or interface depicted in FIG. 3.

Exemplary VFS Data Structure

According to one embodiment, VFS representations, such as VFS representation 300, may be generated from an internal hierarchical data structure, such as a shadow file, that stores descriptive information about the VFS and is used to represent the VFS in use and storage. The data structure includes VFS descriptive information, such as the names of the folders and files, the hierarchical arrangement of the folders and files, the size of files, security information (e.g., a user identification and password for one or more of the files), and other information sufficient to regenerate the virtual file system representation.

The data structure may be generated during the first initialization of the apparatus and method and subsequently updated to preserve the current structure and state of the data sources as a result of user, application, or data source changes. This may include an initialization program that creates a root node, one or more child nodes (e.g., data sources and new view nodes), provides security to the nodes (e.g., a user identification and password to use access one or more nodes) and other features. Typically, the data sources are identified to the operating system, and the operating system provides the shadow file and/or the VFS with a list of data sources. Some of these data sources may require activation, based on the security information created for them during initialization or afterward. A list of data container nodes may then be obtained.

The shadow file may be updated or modified to reflect and preserve the current state, structure, and properties of the VFS. For example, the VFS may be modified after a new data source is defined, activated, or deactivated, after folders are copied from the data-sources folder 322 to the new-view folder 324, after a folder in the new-view folder 324 is selected, after creating, renaming, or deleting folders, performing join operations, and for other reasons. That is, the data structures may be updated in response to receiving an indication to update a VFS representation, such as VFS representation 300. According to one embodiment the shadow file is also updated periodically and when a representation of the VFS is shutdown. This will permit the representation of the VFS to be reconstructed in the event of operational problems, such as system failure.

Different data structures may be used to represent the VFS in use and storage. For example, a balanced tree with keys to order file system elements in use the VFS (e.g., the name of the file system element) may be used to represent the VFS in use, whereas an XML representation may be more suitable for storing the VFS. The XML format file may include tags corresponding to the descriptive information and may capture all the information necessary to re-create the VFS. Each VFS node, except for those representing data files, is transformed into an XML <node> that includes descriptive information to re-create the VFS node. For example, an exemplary XML representation of a data source element named "Pubs":

```
<node>
<name>Pubs</name>
<short_name>PUBS</short_name>
<extension></extension>
<user>test</user>
<node_path></node_path>
<key_table></key_table>
<connection_name></connection_name>
<html_template></html_template>
<xml_column></xml_column>
<xsl_script></xsl_script>
<dtd></dtd>
<password>odprr]nr</password>
<version>1</version>
<type>6</type>
<request_error>0</request_error>
<data_timeout>0</data_timeout>
<join_column>0</join_column>
<join_type>0</join_type>
<which_userid>1</which_userid>
<inactive>0</inactive>
<writeallowed>0</writeallowed>
<deleterecordallowed>0</deleterecordallowed>
<maxrows>10000</maxrows>
<maxjointime>300</maxjointime>
<java_script>0</java_script>
<connection_timeout>120</connection_timeout>
<max_data_size>102400</max_data_size>
<xml_main_child>0</xml_main_child>
<pre-fetch>0</pre-fetch>
<last_shadow_item>42</last_shadow_item>
<table_qual></table_qual>
<schema_qual></schema_qual>
<catalog_qual></catalog_qual>
<selector>
   < table ></table>
   < CatQual ></CatQual>
   <SchemaQual></SchemaQual>
</selector>
</node>
```

Accordingly, the XML may contain descriptive information regarding the state, structure, and properties of the VFS and may be used to generate the VFS at initialization. This descriptive information may include names for the folders and files, hierarchy, security information (e.g., passwords, allowed user identifications), applicable templates (e.g., HTML, DTD), data access controls (e.g., maxrows), whether pre-fetch is used, applicable scripts (e.g., java, XSL), and other information shown or desired for the particular implementation. The process of transforming the VFS into an XML representation includes traversing the VFS and creating a node structure for each folder node in the VFS. Other data structures capable of representing the properties and hierarchy of the VFS may also be used.

Although a representation or interface for the VFS may resemble that of an actual file system in use and/or appearance, as should now be apparent, the VFS typically has certain salient differences from the actual file system. Typically the VFS, in contrast to an actual file system is not used to manage disk storage on a computer system and does not contain a link to the start memory allocation unit that indicates a memory allocation unit that the operating system uses to start a file. Or if it does, it contains less such links than an actual file system and is not a primary priority for the VFS. Likewise, the VFS usually does not contain information about which memory allocation units of a memory are currently occupied or used by data and which are not currently used by data. Accordingly, since the VFS is different than the actual file system, the VFS is generally generated from a data structure, such as the shadow file, that is different in type and content than all the data structures known to generate actual file systems, such as file allocation table (FAT)-based data structures.

Figure 4:
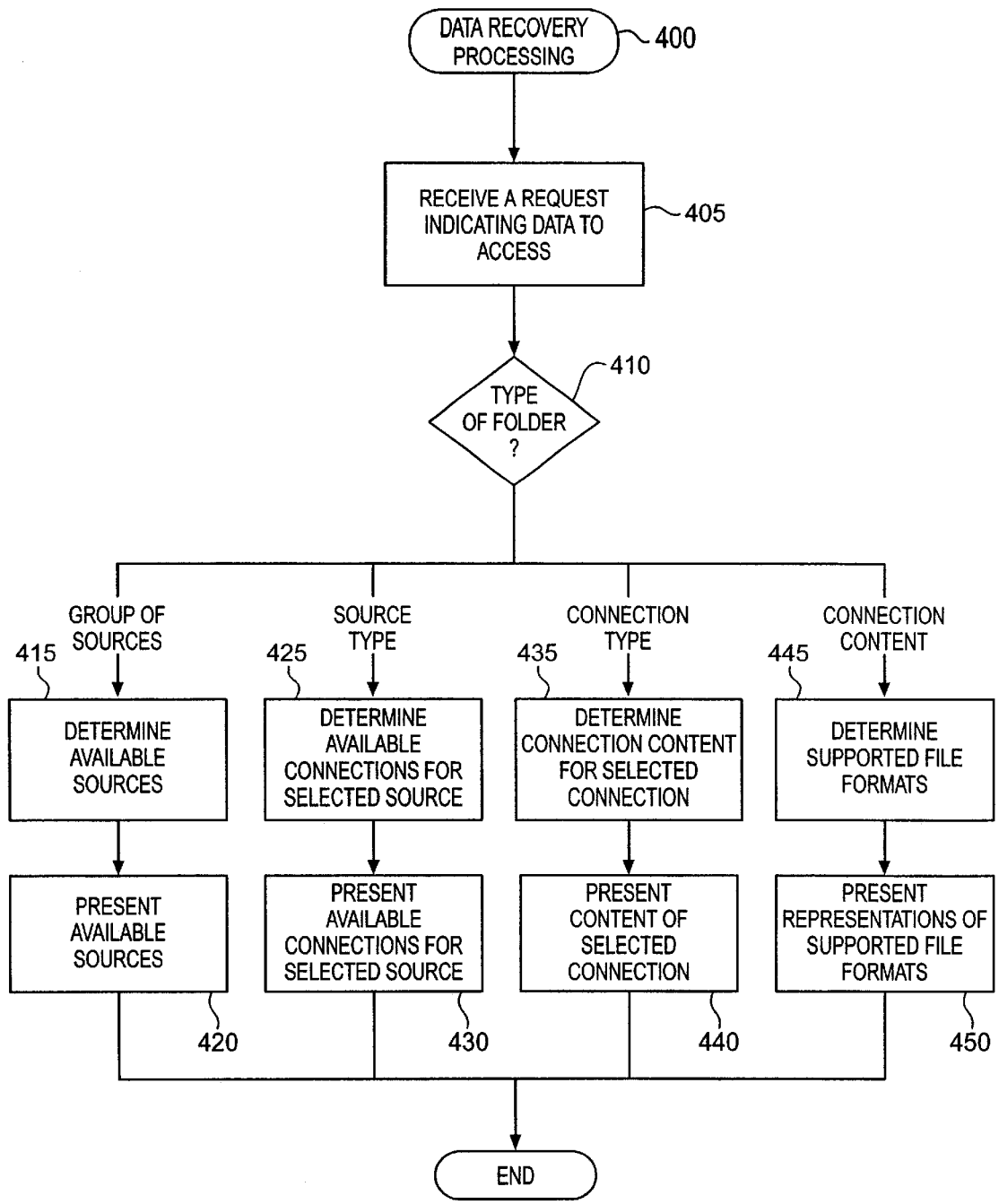
FIG. 4 is a block diagram illustrating data discovery processing, according to one embodiment.

Presenting and Manipulating General Purpose Data Sources
Data Discovery Processing FIG. 4 shows data discovery processing, according to one embodiment of the invention. The processing may be performed on a VFS 110, such as that represented by VFS representation 300, or on another VFS 110. Typically, data discovery processing includes accessing or querying a data source to determine structural information that describes the structure of data in the data source. The structural information may include content available from the data source, such as how the data is divided into tables, and the number and names of the columns and rows. This structural information may then be transformed into a hierarchical representation comprised of a plurality of folders and files, such as that shown in FIG. 3. This hierarchical representation may represent and present the data source and the structure of the data source, as discussed below.

At block 405, a request to access data is received. This may include a user or application navigating through a VFS representation and selecting a folder or file. At block 410, the type of folder is determined in order to determine the type of processing to be performed. The type of folder may correspond to folders at different levels of the exemplary VFS representation 300 of FIG. 3.

Blocks 415 and 420 show processing for a folder associated with a group of sources. For example, this processing may apply to the data-sources folder 322 shown in the VFS representation 300 of FIG. 3. At block 415, the available sources are determined. According to one embodiment, these sources may be predetermined, such as by registering them with the operating system or the VFS 110, so that determining these sources does not involve contacting the actual data sources. Then, at block 420 the available sources are discovered (e.g., presented or displayed). For example, referring to the VFS representation 300 of FIG. 3, the ODBC Sources, and Other sources (e.g., EDI, XML, etc.) may be presented via the VFS representation 300.

Blocks 425 and 430 show processing for a folder corresponding to a particular source type. For example, this processing may apply to selecting the ODBC Sources folder discussed in FIG. 3. At block 425 the available connections for the selected source are determined. This may include connections to various types of databases, such as Informix, Oracle, and others. In a networking environment, the available connections may correspond to a shared server having drivers or middleware to assist in using the database. According to one embodiment, the available connections may be registered with the operating system and/or the VFS 110, and the available connections may be determined without contacting the actual data sources. At block 430, the available connections for the selected source are presented. For example, referring to the VFS representation 300 of FIG. 3, the Informix and Oracle folders are displayed.

Blocks 435 and 440 show processing for a folder corresponding to a particular connection. At block 435 the connection content for the selected connection is determined. Typically, this will include interacting with the data sources to determine what tables or other data are available. Alternatively, in situations where the tables or other data are relatively static, this may be determined from the operating system or the VFS 110. At block 440, the content of the selected connection is presented. For example, referring to the VFS representation 300 of FIG. 3, the Author, Sales, and Title folders, which may correspond to tables in the Oracle database, are displayed.

Blocks 445 and 450 show processing for a folder having particular connection content. At block 445 the supported file formats are determined. Typically, a predetermined number of formats will be supported. Then, at block 450, representations of the supported file formats are presented. For example, as shown in FIG. 3, Title.csv, Title.htm, and Title.txt are displayed. Data may then be accessed in the appropriate format by indicating one of these representations and performing read processing, which will be described below.

According to one embodiment, data discovery processing includes using the FSI 235 and the DAM 240 to determine directory information. An exemplary control flow for such data discovery processing is discussed briefly below. First, a system initialization and control flow may be used. The FSI 235 registers callback routines with the operating system and returns control to the operating system. The DAM initializes certain services, such as tracing, constructs the VFS structure and/or representation from a data structure, and creates a pool of CmdIOCTLs. Once initialized, the FSI 235 and DAM are available to perform operations such as data discovery processing.

Data discovery processing typically includes determining directory information, and may use the exemplary control flow discussed below. The operating system receives a request to query the contents of a directory from a user or application. Then, the operating system initiates or drives a QueryDirectory( ) routine, typically associated with or belonging to the FSI 235. The QueryDirectory( ) routine includes a number of operations that are typically performed by the FSI 235. First, an FCB is obtained for the given directory. Then, a DirIOCTL is obtained for the given directory. Often, the given directory will have a tree structure of directory contents (e.g., folders and files). The names of the directory items are obtained, frequently in a loop, until there are no additional directory items. Typically, the directory items are destined for storage in a system return buffer. Frequently, this includes a determination of whether the system return buffer can accommodate the current directory item. If the return buffer cannot accommodate the current directory item, a return status is set and control is returned to the operating system. Alternatively, if the system return buffer can accommodate the directory item, the directory item is added to the system return buffer. This same processing may be repeated on each of the remaining directory items. When no directory items remain, return status is set, and control is returned to the operating system. The result of execution of operations of the QueryDirectory( ) routine is an operating system specific listing of the directory contents for the given directory. For example, this may be used to reveal a plurality of folders representing tables available from a relational database.

The DAM also participates in determining directory information and control flow. A CmdIOCTL receives a DirectoryCommand request to determine directory information. CmdIOCTL extracts request information which it uses to request directory information from the DAM. The DAM performs a number of operations. The DAM creates a list of individual items in a path name (e.g., /a/b/c=list of "a", "b", "c"). All path elements in a requested item name are determined and a list is created for each element in the list. The DAM attempts to find the directory element in the VFS 110. If the directory element is not found in the VFS 110, then an error indicator is set and an error response is sent to the FSI 235. Alternatively, if the directory element is found in the VFS 110, then the routine is advanced or moved to the next element in the list. Finally, sending the requested directory node to the FSI 235 completes the request.

Read Processing

Figure 5:
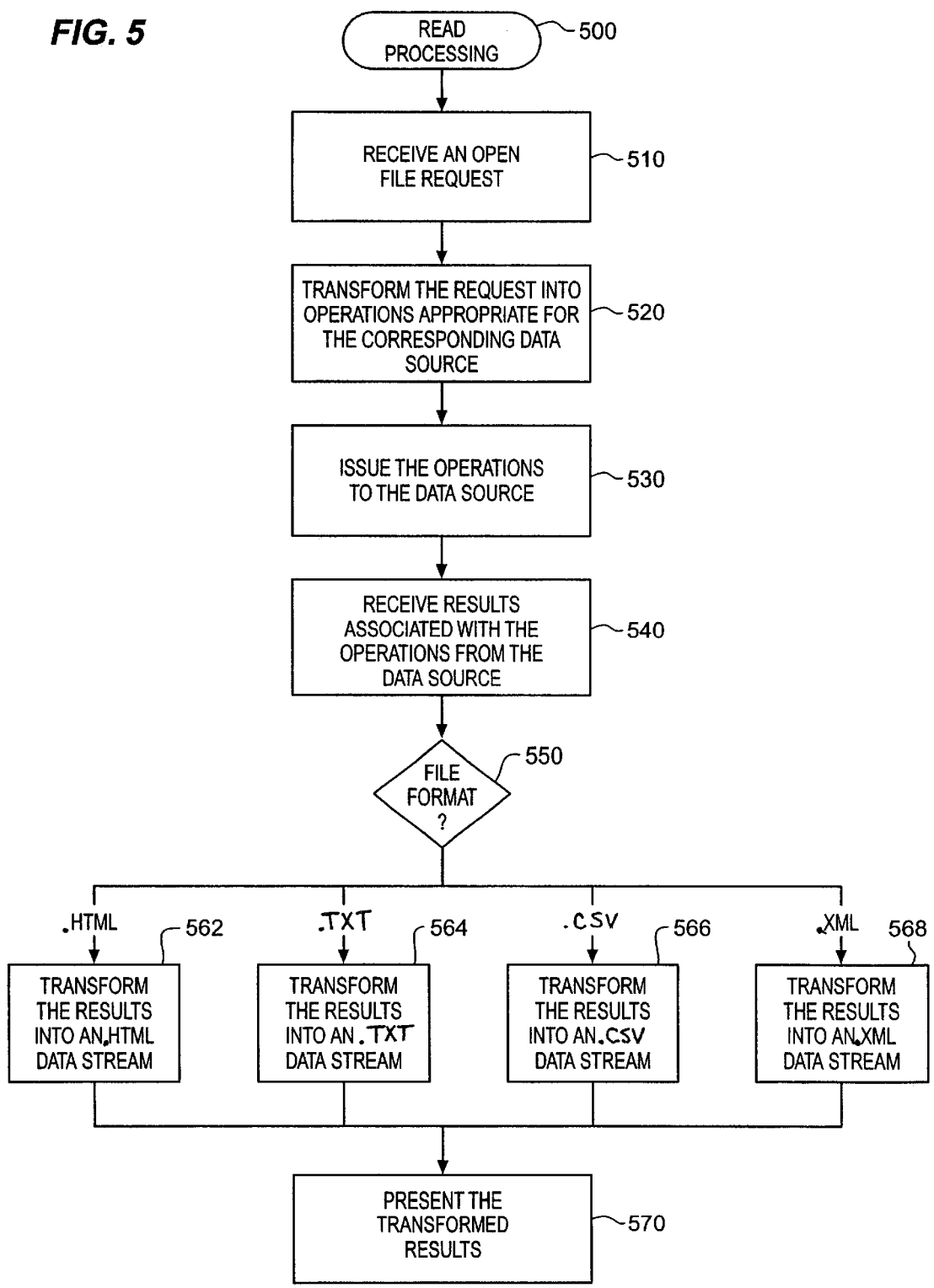
FIG. 5 is a block diagram illustrating read processing, according to one embodiment.

Read processing may be used to access and receive data from a data source. FIG. 5 shows read processing, according to one embodiment of the invention. Typically read processing is initiated following a request for information about a data source that is communicated via the VFS 110. At block 510, an open file request is received. For example, a user may issue this request by manipulating the VFS or a representation of the VFS capable of communicating the manipulation, or an application may issue this request by issuing a message or data structure that is interpreted as an open file request. After receiving an open file request, the request is communicated to a DMT 120. For example, after being manipulated, the VFS 110 and the file system may send a corresponding message to the DMT.

At block 520 the communicated request is transformed into operations appropriate for one or more potentially disparate data sources associated with the request. This may include generating or identifying a query in a language or format appropriate for the data source. At block 530 the operations are issued or sent to the target one or more data sources.

At block 540, results corresponding to the query are received from the one or more data sources. Typically, the results will be received from each of the data sources in the native formats of the data sources. For example, results from an ODBC database may be in ODBC format. The results may be transformed from their native language or format into an alternative or more useful format. The results may then be converted into a common or internal format, such as XML, to reduce the number of format translations that need to be supported. For example, rather than providing translations for N input formats into M output formats (i.e., N×M), translations may only be provided for N input formats to a common format and M translations from the common format to the output formats (i.e., N+M). This may reduce the number of translation instructions and reduce the subsequent burdens of adding new formats. In any event, the results may be provided via a folder in the VFS 110.

At block 550, a file format for presenting the data is determined. Frequently, this determination will be based on the initial open file request. The format may be any desired type of format, including formats to be presented to existing applications (e.g., databases, spreadsheets, word processors, etc.), devices (e.g., printers, fax machines, etc.).

Blocks 562, 564, 566, and 568 show processing for four exemplary file formats. At block 562, the results (or a corresponding internal representation of the results) are transformed into an HTML format (e.g., .html). Data in such format may be accessed using browsers, word processors, and other applications. At block 564, the results are transformed into a text (e.g., .txt) format that may be viewed using Notepad. At block 566, the results are transformed into a comma-separated value (.csv) format that may be viewed using a spreadsheet like Microsoft® Excel. Likewise, at block 568 the results are transformed into an XML format, typically with a predetermined dialect that may be viewed using a browser and other applications. Typically, transformation or format conversion will be achieved by existing conversion instructions for each desired transformation, in order to improve the speed and efficiency of the system and method.

At block 570 the transformed results are presented or displayed in the corresponding format. For example, results in XML format may be customized via a stylesheet definition and displayed to a user via a browser. Alternatively, the results may be supplied to an application, such as an inventory management software application or software facilitating an Internet marketplace. Other interactions between the user or application and the data sources will be discussed further below.

Figure 6:
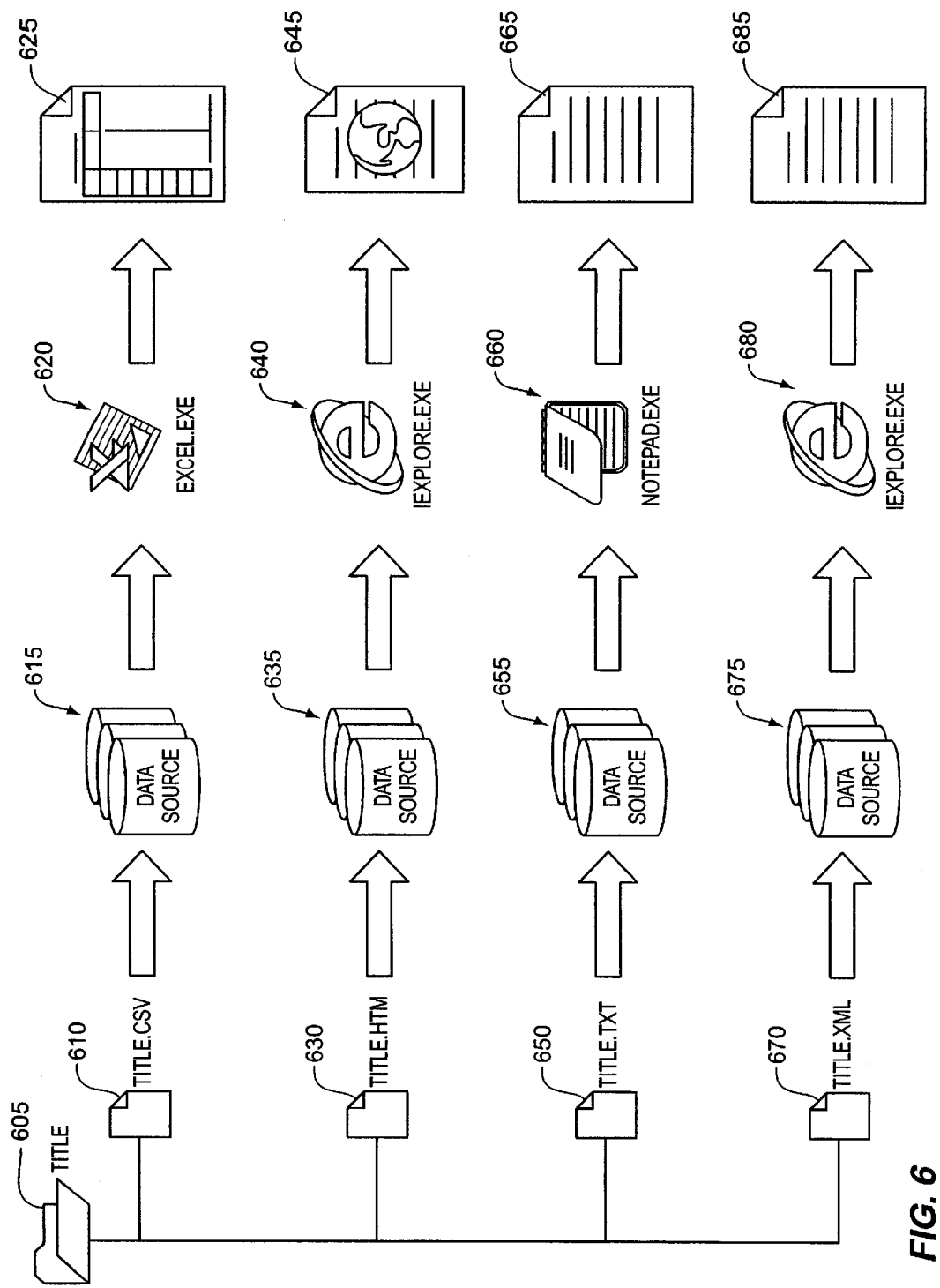
FIG. 6 conceptually illustrates read processing, according to one embodiment.

FIG. 6 shows displaying or presenting data in different formats, according to one embodiment of the invention. A title folder 605 is open, revealing exemplary title files having different formats. A Title.csv file 610 has a comma-separated value format. Selection of this file causes a comma-separated value compatible application, such as Microsoft® Excel 620, to make a file system request associated with the file 610 that leads to an interaction with the data source 615, which may be a disparate set of data sources. The data source then returns data that may, after transformation, be displayed or presented using a spreadsheet like Microsoft® Excel 620. Microsoft® Excel may then be used to display, present, or print the data 625. Likewise, a Title.htm file 630 may be selected causing an application compatible with such a format, such as Microsoft® Internet Explorer 840, to make a file system request and obtain data corresponding to the file 630 from the data source 635. The data source returns data that may be displayed, presented, or printed 645 via a browser application like Microsoft® Internet Explorer 840. Similarly, a Title.txt file 650 may be selected causing a request to be issued on data source 655. The data source returns data that may be displayed, presented, or printed 665 using Microsoft® Notepad. Likewise, a Title.xml file 670 may be selected causing a request to be issued on data source 675. The data source returns data that may be displayed, presented, or printed 685 using a browser like Microsoft® Internet Explorer.

According to one embodiment, read processing includes using the FSI 235 and the DAM 240 to open a file and read a file. Read processing typically begins with opening a file. The following control flow may be used in one exemplary embodiment of read processing. The operating system receives a request to open a file from a user or application and then drives the an OpenFile( ) routine for handling an open file request. Typically the OpenFile( ) routine is associated with the FSI 235 and performed by the FSI 235. The OpenFile routine includes a number of operations, starting with validating the request. If the request is not valid, error information is set, and control is returned to the operating system with an error indicator. The OpenFile( ) routine searches for an FCB that matches the requested file. If the FCB does not exist it creates an FCB with a given name and attributes, creates a context for the request, adds the context to the FCB, and adds the FCB to a list of open files. Alternatively, if the FCB does exist, a context is created and added to the existing FCB. Then, the use-count for the FCB is incremented. Next, it is determined if an DirIOCTL exists for this FCB. If a DirIOCTL does not exist, a directory request is sent to an available CmdIOCTL. A completion of the request is awaited. If the request fails (e.g., timed-out or an error received), error information is set and control returns to the operating system with the error indicator. Alternatively, the DirIOCTL information is stored in the FCB. A successful return status is set, and then a return to the operating system.

Closing a file is usually triggered by the operating system receiving a request to close a file from a user or application. The operating system then drives a CloseFile( ) routine. The CloseFile( ) routine is typically associated with the FSI 235 and implemented by the FSI 235. This routine decrements the "use count" for the FCB, and removes the FCB from the internal list and deletes storage for the FCB when the use count becomes zero.

After opening the file, read processing includes reading data from the file. The operating system receives a request to read data from a file from a user or application. Then, the operating system drives a ReadFile( ) routine. The ReadFile( ) routine is typically associated with the FSI 235 and implemented or performed by the FSI 235. The routine includes a number of operations, starting with validating the request. If the request is not valid, error information is set, and control is returned to the operating system with an error indicator. Read parameters are determined from operating system input data, starting offset and length. The read parameters are validated. If the request is not valid, error information is set, and control is returned to the operating system with an error indicator. A context for the user or application is obtained. If it is determined that there is no context, error information is set, and control is returned to the operating system with an error indicator. A DirIOCTL associated with this file is obtained. The files size is obtained, including using CmdIOTL to request the file size from the DAM 240 and wait for the request to be completed. If the request fails error information is set, and control is returned to the operating system with an error indicator. If it is determined that the incoming offset is greater than or equal to the file size, then a status for the end of file is set and control is returned to the operating system. Then a series of operations are performed. First, a determination is made whether a DataIOCTL is present that contains the requested information. If the DataIOCTL is not present, a CmdIOCTL is used to request file data from the DAM 240 for given offset and length and the request is awaited. If the request fails, error status is set, and control is returned to the operating system. Data is copied from the DataIOCTL to the system return buffer as long as there is still data to read. Then, when there is no more data to read, a successful return status is set and control is returned to the operating system. Depending on the length of data to read, the above may be achieved by using multiple DataIOCTL to satisfy the request.

The DAM 240 also participates in reading data from the file. A CmdIOCTL receives a request to get the file size. Then, the CmdIOCTL extracts the request information and requests the file size information from the DAM 240. The DAM 240 performs a number of operations, starting with creating a DataIOCTL for the requested file. The DataIOCTL may contain all the data in the file or a portion for large files that surpass the capacity of the DataIOCTL. Typically, the data in the DataIOCTL is not in a format expected by the operating system or in a format or presentation view requested by a user or application. The DAM 240 invokes a filter associated with the file format or presentation view and transforms the data into a byte stream that is appropriate for the given file format. The DataIOCTL is associated with this item's node in the VFS 110. A FileSizeIOCTL is created to return the file size information to the FSI 235. Then, the FileSizeIOCTL is sent as a response to the request. Data discovery and read processing have been discussed above. Many variations of this processing are contemplated. Additionally, exemplary control flows have been described for this processing. Many variations for these control flows are contemplated. Additionally, based on the present disclosure, those skilled in the art will be able to develop similar or suitable control flows for implementing and controlling write processing, join processing, and other processing that is desired for the particular implementation.

Dynamic Transformation of Data Sources

As discussed above, one advantage of certain embodiments of the invention is that a live link is maintained to the data sources so that the data may be dynamically accessed, presented, and manipulated. This largely eliminates a problem with existing ways of using data from data sources that involve laboriously extracting data from a database into a copy with a particular format that requires additional storage and becomes incorrect and obsolete when the database is subsequently updated or changed.

Rather, embodiments of the invention allow access to data and structural information in a way that is naturally and intuitively linked to the data sources and may be updated when it is needed or according to other strategies for managing such updates. That is, while a file is represented in the VFS 110, it is under the control of logic and the described processing, which allow it to be updated to reflect changes to data and structure of the data sources. When a file of the VFS 110 is selected, the selection initiates communication with the data sources to obtain up-to-date information. Accordingly, before a file is selected, it contains a linking logic and framework that may be used to selectively access data, according to the logic and framework, when the file is selected or activated. By way of example, this is in contrast to a prior art approach that involves an independent file or copy that has no ties back to the data sources, since it is not part of the VFS framework and logic.

XML Processing

One embodiment of the invention may be used to transform data from data sources into XML. XML is a specification for storing and exchanging data created by the World Wide Web Consortium (W3C) that is well known to those skilled in the art. XML is a structured format for storing data comprised of data elements and tags. Each data element is identified by and contained within a set of two self-describing, human-readable tags that define or characterize the data. XML is also a hierarchical format, since one data element (such as a root element) or set of tags may contain other data elements and sets of tags. That is, certain data and tags may nest or organize other data and tags. This similarity to the hierarchical structure of a VFS 110 may be used to convert between VFS representations of data, which have been previously described, and XML-formatted representations. In one embodiment, data in relational format may be transformed into XML format.

XML has different dialects or conventions for naming tags for the same or similar data. For example, one dialect may use tags <postalcode></postalcode>, whereas another dialect may use <zipcode></zipcode>. Typically, the dialects of XML are based on different protocols or agreed upon formats for particular industries, business partnerships, or other entities. Frequently used XML dialects for e-commerce include cXML (Commercial XML) developed by Ariba, CBL (Common Business Library) developed by Commerce One, BizTalk, and others. These dialects may have different DTDs and XML schemas. Thus, these may be regarded as different dialects of the same data manipulation language. Also, XML data in one dialect may be translated or transformed into XML data in another dialect. For example, XSLT may be used with the VFS 110 for this purpose. As discussed above, embodiments may support any type of data manipulation language, including any dialect of XML, and may be used to translate from one dialect to another.

Figure 7:
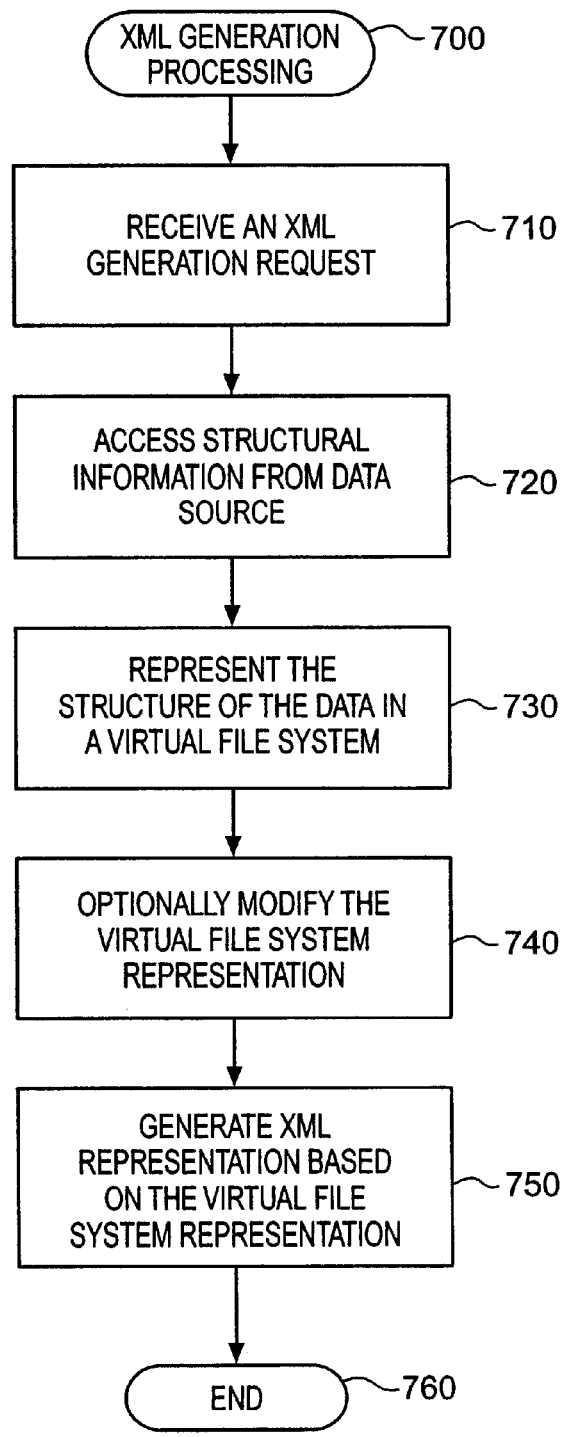
FIG. 7 is a block diagram illustrating XML processing, according to one embodiment.

FIG. 7 shows XML processing, according to one embodiment of the invention. At block 710 an XML generation request is received from a user or application that initiates the request. The request may indicate data to be converted to XML format. The request may include or may be followed by one or more additional requests that specify XML generation preferences. The preferences may manage or control how the XML is generated based on the data sources. By way of example, the preferences may specify how the VFS 110 is to be modified or how the structure of the XML is to be generated. For example, they may specify how VFS folders are to be renamed according to naming conventions for the XML tags, or may specify a DTD, XSL or other appropriate data structure useful for guiding such preferences. The preferences may also specify criteria for selecting a subset of data, may indicate join criteria, or make other specifications desirable for the particular implementation.

At block 720, structural information is accessed from one or more appropriate data sources. The structure describes the structure of data in the data sources and is related to how the data is arranged and organized into data objects (e.g., tables) and data object substructure based on properties or characteristics of the data (e.g., columns and rows) in the data sources. This may include transforming the request together with any relevant optional preferences into operations appropriate for the data sources. By way of example, queries may be issued in an SQL-based format to a database or DBMS to determine a name of a table, numbers and names of columns, numbers and names of columns rows, and other information corresponding to a particular subset of data that satisfies a criteria indicated in the queries.

The operations are also issued to the appropriate data sources. In some embodiments, the operations may be issued to remote data sources via a computer network (e.g., LAN, WAN, MAN), the Internet, the World Wide Web, or another network. In such embodiments, issuing may include using additional network or Internet applications, such as browsers, that permit connection with the data sources, exchange of data streams, guarantee of delivery, security, encryption, and other features typically desired for communication on such mediums.

Results associated with the operations are received from the data sources. The results include structure, hierarchy, relational features, or other properties of the one or more data sources used to generate XML. Data may also be received, or may be received at a later time when they are needed, depending on the particular implementation. When many of the XML records are the same or similar, such as many rows in a relational database table, the information eventually used to create the XML tags may be transmitted once, together with the number of records to be generated, to reduce transmission bandwidth.

At block 730, the structure of the data is represented in a virtual file system. This may include creating or providing a number of folders in an ordered hierarchical arrangement corresponding to the received structural information, hierarchy, or relational features, according to an existing, stored, predetermined coded strategy or rule set for interpreting the structural information for each type of data source. For example, a folder may be created for each column of a relational table and the folders may be named based on the names of the columns in the relational table. The folders may be named based on names derived from the structural information (e.g., names of columns of a relational table). An existing stored set of rules or instructions may be used to interpret the structural information and unambiguously derive the virtual file system representation based on the structural information. In one embodiment, this logic is part of the DMT 120.

At block 740, the ordered hierarchical arrangement may optionally be modified. Typically, the modification will be performed in order to manage or control how the XML is finally generated. In one embodiment, the modification will be used to impose additional or different structure on the VFS 110 so that the XML generated has a modified structure that is suitable or more useful for its intended use. This modification may be manually performed, such as by using a cursor control device or commands to modify the VFS 110 or a representation of the VFS, or may be automated by a data structure that includes mapping information to map the ordered hierarchical arrangement to a desired modified ordered hierarchical arrangement. For example, a folder may be mapped to a pair or XML tags. This may be related to a desired XML schema or DTD. The result of any optional modifications is a different ordered hierarchical arrangement of folders. The order and the names of the folders may have been modified.

At block 750, an XML-based representation based on or consistent with the optionally modified ordered hierarchical arrangement in the VFS 110 is generated. The XML-based representation typically has the properties previously discussed for XML, including a hierarchical plurality of data-describing, human-readable data delimiters and data elements enclosed in a pair of the human-readable data delimiters or tags. According to one embodiment, conversion instructions are used to convert the ordered hierarchical arrangement into the XML. These conversion instructions may use an XML schema or DTD to convert the VFS 110 into the XML. For example, the instructions may map names of VFS folders to XML tags with different names, and may insert organizational tags to make the final XML conform to the expectations of an ultimate user of the XML formatted data. Alternatively, the XML may be directly derived from the VFS hierarchy and naming conventions, if the use of the XML allows for dialect flexibility. The XML representation will typically be populated with data from the data source (e.g., filling a pair of tags with a data element that is described by the tags), and delivered to a requestor associated with the request, or further processed, or used for another intended purpose.

Figure 8:
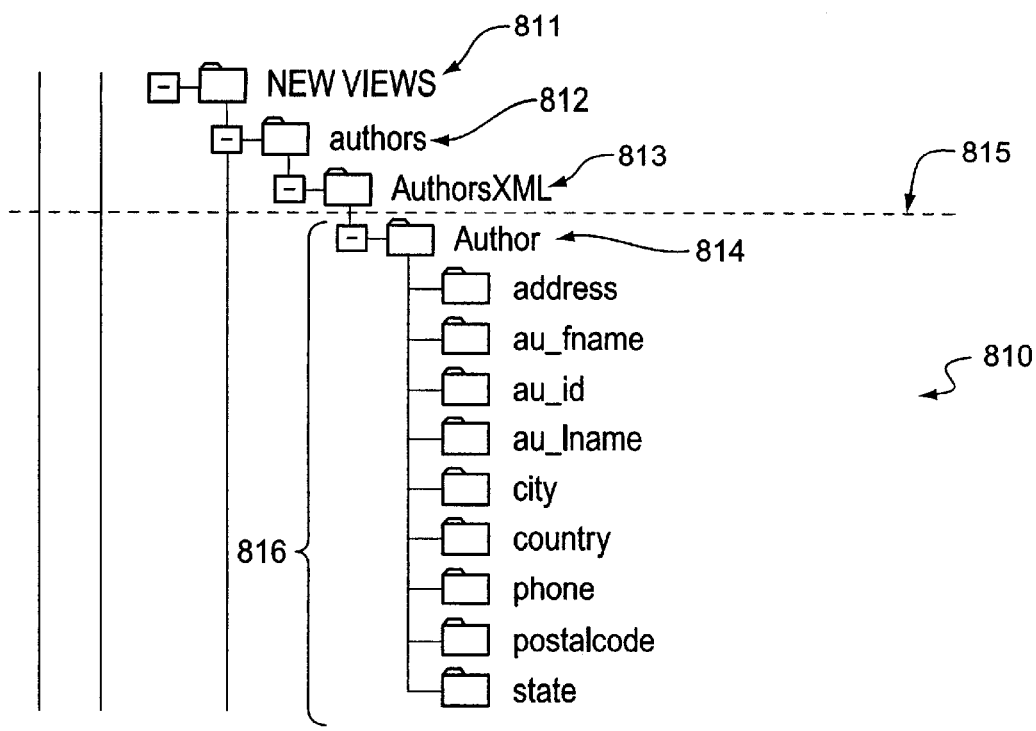
FIG. 8 conceptually illustrates XML processing, according to one embodiment.

FIG. 8 shows that database data may be automatically formatted as XML data, according to one embodiment. The specific operations described below are determined by expectation of the code or software that interprets the VFS 110 and generates the XML-formatted data based on the VFS 110. Accordingly, other operations are contemplated. First, a new folder is created in the VFS 110 to serve as the storage area for the new view. As shown in VFS representation 810, an authors folder 812 is created within the new-view folder 811. Then, the data that is to be converted to XML is copied into this directory. According to one embodiment, structural information may be obtained from this data, rather than by querying the target data sources. Then, a new folder AuthorsXML 813 is created within the authors folder 812. At this point, the software may recognize that the data copied into the authors folder is to be formatted as XML, and perform the needed operations.

XML generation preferences may also be provided or specified, prior to generating the XML, when desirable. Typically an interface or GUI is used to provide such preferences, including preferences for how the XML is generated and to manage and control generation of the XML. For example, a user may use a mouse to right click on the AuthorsXML folder and activate a properties GUI that may be used to enter a record name, such as authors 814, specify an XSL and DTD to be used, and provide other direction or control that is desired for the particular implementation. In some implementations, it may be desirable to generate multiple XML files having different formats.

A dashed line 815 is used to distinguish folders 816 that are automatically generated by code in the exemplary embodiment. The authors folder 814 is based on the specified record name, although it could be based on a database object or table name in other implementations. Beneath the authors folder are folders for address, au_fname (authors first name), au_id (author identification), au_lname (authors last name), city, country, phone, postalcode, and state subfolders. As discussed, these folders are created based on the identified data in the data source according to a predetermined way of interpreting the identified data. Considering an identified table of data in relational format, the folders may correspond to columns of the table of data. That is, the table may have columns for address, au_fname, etc.

XML data 830 may be created automatically based on the VFS representation 830 and/or the results received from the data sources. The XML data 830 may be created at approximately the same time as the folders 816, or be delayed until after an optional modification of the VFS representation 830. Once the XML data 830 is generated, it typically has structure very similar to the structure of the VFS representation 830. The tags shown are based on the names of the VFS folders, although the tags could also be translated or converted to a particular dialect of XML. For example, the folder address is expressed in XML as <address>10932 Bigge Rd.</address>, where the data element between the tags represents an actual address from the table of database data. According to one embodiment, the XML-formatted data may be refreshed directly from the data in the data sources, just like other directories. However, typically the XML structure will not be altered when the source database structure changes, so that optional alterations and customizations need not be entered repeatedly.

As discussed above, one embodiment of the invention provides an easily modified VFS representation, such as exemplary VFS representation 830. Such modifications may be used to alter the structure and format of the XML that is automatically generated. Optionally, nesting folders may be added to the VFS representation 830, folders may be moved, renamed, and other manipulations of the VFS representation 830 may be performed. These manipulations may be manual or may be code or instruction generated, depending on the nature of the manipulations. After any such optional modifications, XML may be generated consistent with the modifications.

Figure 9:
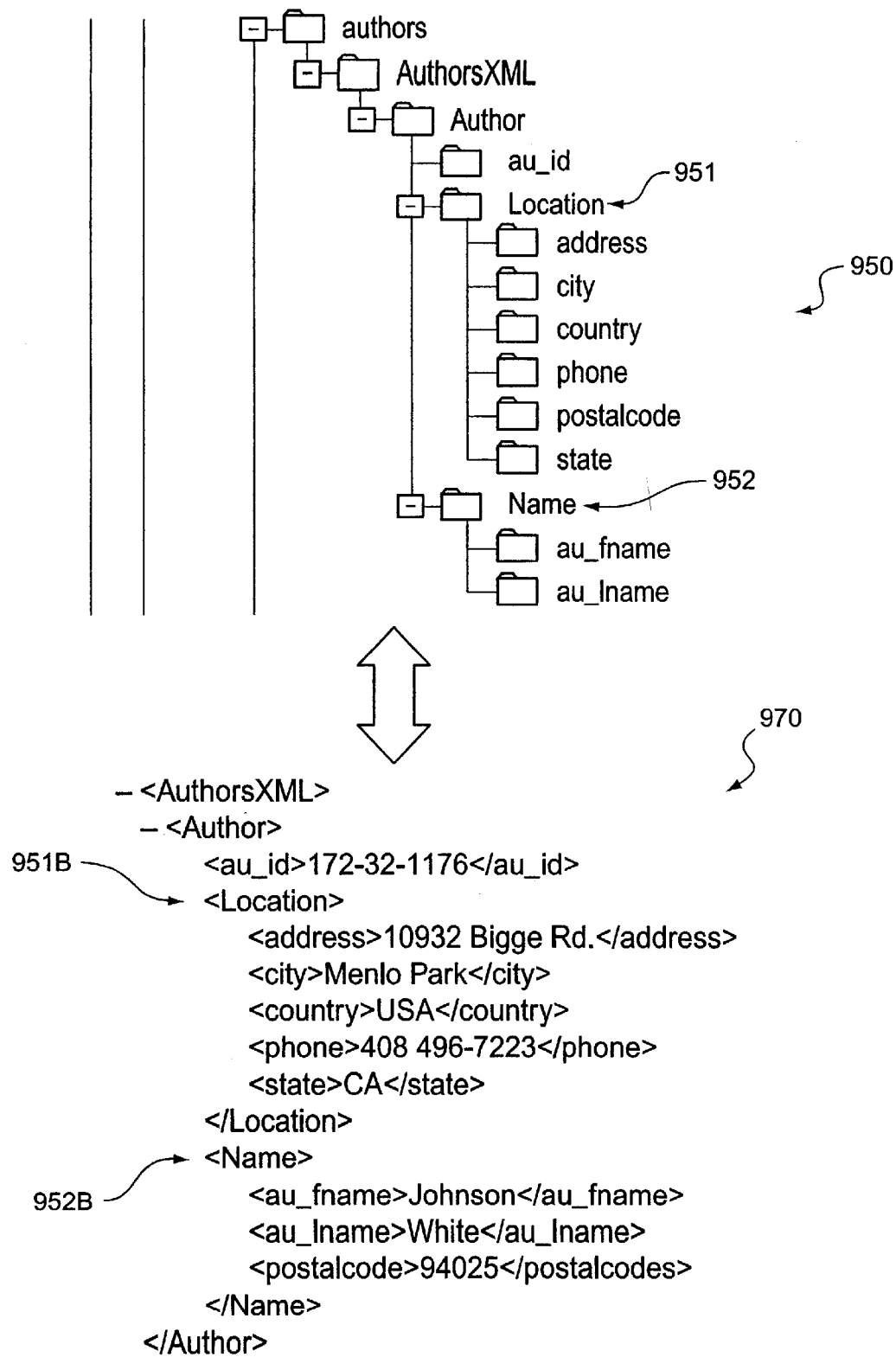
FIG. 9 conceptually illustrates XML processing, according to one embodiment.

FIG. 9 shows a VFS representation 950 that includes several exemplary modifications of the VFS representation 810. As shown, several of the folders have been moved. Nesting folders "Location" 951 and "Name" 952 have been added to further organize the existing folders. Other modifications could be performed so that the XML that is automatically generated based on the VFS representation 950 suits the intended use.

XML data 970 may be created automatically based on the VFS representation 950. The XML data 970 has structure similar to and based on a structure of the VFS representation 950. For example, the hierarchy and order of the XML tags is similar to the hierarchy and order of the folders in the VFS representation 950. The XML data also includes nesting location 951B and name 952B tag pairs corresponding to "Location" 951 and "Name" 952 folders, respectively.

Thus, as discussed above, XML may be generated for a data source having structured data of any arbitrary format, by using the VFS 110. In one embodiment, the structured data is first represented in a VFS or VFS representation, such as VFS representation 810, according to predetermined instructions for determining the structure of the data and representing the structure in the VFS representation. Then, after optional modifications of the VFS 110, additional predetermined instructions are used to examine the VFS 110 or representation and generate corresponding XML that reflects the salient features of the VFS 110. Accordingly, the VFS 110 may serve as an intermediary or data format translator between legacy data sources that do not communicate in XML, and users and applications, such as Internet and B2B users and applications, that do communicate in XML.

Write Processing

Embodiments of the invention may also be used to modify data sources by writing to the data sources. The writing may be used to add data to a database, update data in a database, provide status information (e.g., to confirm transmission of data or confirm a purchase), to facilitate business transactions, such as submitting purchase orders, submitting requests for shipping status, and perform other well-known transactions.

Typically, write operations begin by a connected data source, user, or application providing or writing data to the VFS 110. For example, the data source or the application may communicate the data in a message, or the user may enter data via a data entry device. Then, a write operation is recognized when a distinct predetermined manipulation of the VFS 110 that indicates a write operation is detected. For example, this could include moving file into a sub-folder of the data-sources folder 322 shown in FIG. 3. Many types of files are contemplated, including transactional files (e.g., purchase orders, invoices, price quotes) and other files. Once the distinct predetermined manipulation of the VFS 110 is detected, operations appropriate for the target data sources are generated and issued. Generating these operations may include displaying a GUI to accept qualifying descriptive parameters of the write operation, combining the information with stored descriptive information that describes the use and properties of the target data sources (e.g., security information, format information, data manipulation language information, network address information, style/format information, and other information). Generating may also include re-formatting the data to a format compatible with and expected by the target data sources. In this way, a provider may write data to a data source in its native format, without having to know or care whether the data source recognizes that format.

Figure 10:
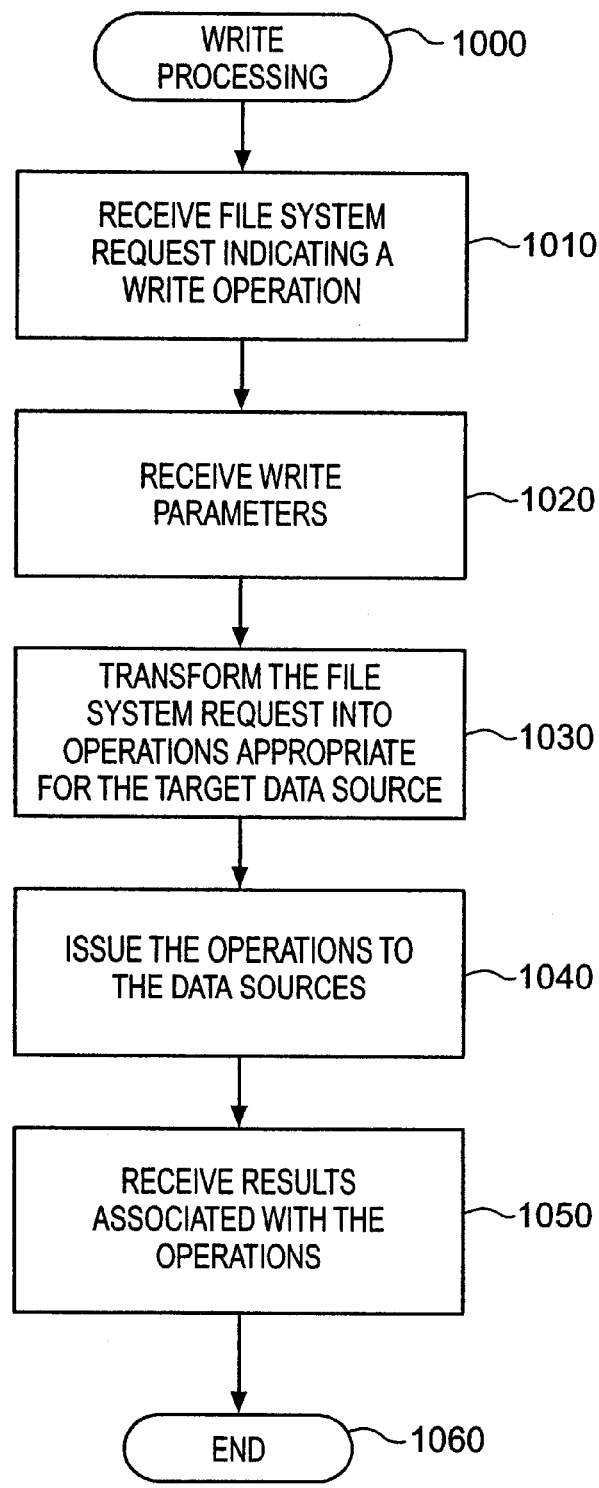
FIG. 10 is a block diagram illustrating write processing, according to one embodiment.

FIG. 10 shows write processing according to one embodiment. At block 1010, a file system request indicating a write operation is received. For example, data or a file may be written into a VFS representation, such as into a folder in the data-sources folder 322 of the VFS representation 300 of FIG. 3. At block 1020, write parameters may optionally be specified. These may include authorization passwords associated with a data source. In one embodiment, these may be accessed as stored information, based on a path specification associated with the folder the data is written into. At block 1030, the the file system request is transformed into operations appropriate for one or more target data sources. Typically, these operations will be similar to operations previously discussed, except that they will be write operations. For example, SQL may be used to write, add, or update data in an SQL-compatible database. At block 1040, the operations are issued or sent to the target data sources. At block 1050, results associated with the operations are received. This may include receiving data in response to the written data. For example, in response to writing purchase order data to a data source, sales agreement data that corresponds to the purchase order data may be received.

Write processing may be used to submit a purchase order to a supliers data source. For example, an exchange may submit a purchase order file into a purchase order folder in a VFS 110. Following this, data from the purchase order (e.g., product identifier, quantity, shipping information), may be inserting in a purchase order processing module or component associated with the suppliers data source. This is similar to manual entry of purchase order data, but may be more efficient and introduce less error.

New Views

The VFS 110 may be used to manipulate general-purpose data sources or create new or custom views responsive to file system operations. Creating a new view based on a single set of data typically includes locating a representation of the data in the VFS 110, providing a criteria consistent with the new view to the data, and using the criteria to create the new view.

In an embodiment associated with the VFS representation 300 shown in FIG. 3, a folder is created in the new-view folder 324 to store the new view. For example, a user may click on the new-view folder 324, indicate that a new folder is desired by using a GUI that is provided, and provide a name for the new folder. Then, a single source folder containing the set of data is located in the data-sources folder 322 and copied to the new folder. Typically, the folder and not just the files are copied.

Next, the new-view criteria are provided. The criteria may include selecting rows, columns, or other subsets of data, and comparing the selected data to a provided value based on an operator (e.g., <, =, >, ≧). Multiple criteria may be provided and linked, such as by using Boolean operators (e.g., and, or, not). By way of example, a user may right-click on a folder containing the data for the new view, and supply the criteria via a GUI. The GUI may have a field to accept columns (or rows), to select an operator, and to enter a value to compare data elements in the selected columns against the value according to the operator. The GUI may also provide other desired features, such as the ability to sort data in the new view alphabetically, by number, by date, by last modification, and according to other criteria.

Certain criteria may be created in advance and stored, so that they can later be easily accessed. In one case, criteria may be created to select only relevant data for a customer id, when the customer id is entered into a field. That is entering the customer id into a field may automatically link to a more intricate criteria that is used to create the new view.

Join Processing

The VFS 110 may be used to create other types of new views, such as joined views. Joined views generally combine one or more sets of data based on join criteria. For example, the VFS 110 may be used to perform join operations on data from multiple potentially heterogeneous data sources, such as data from an SQL database and an EDI database.

Figure 11:
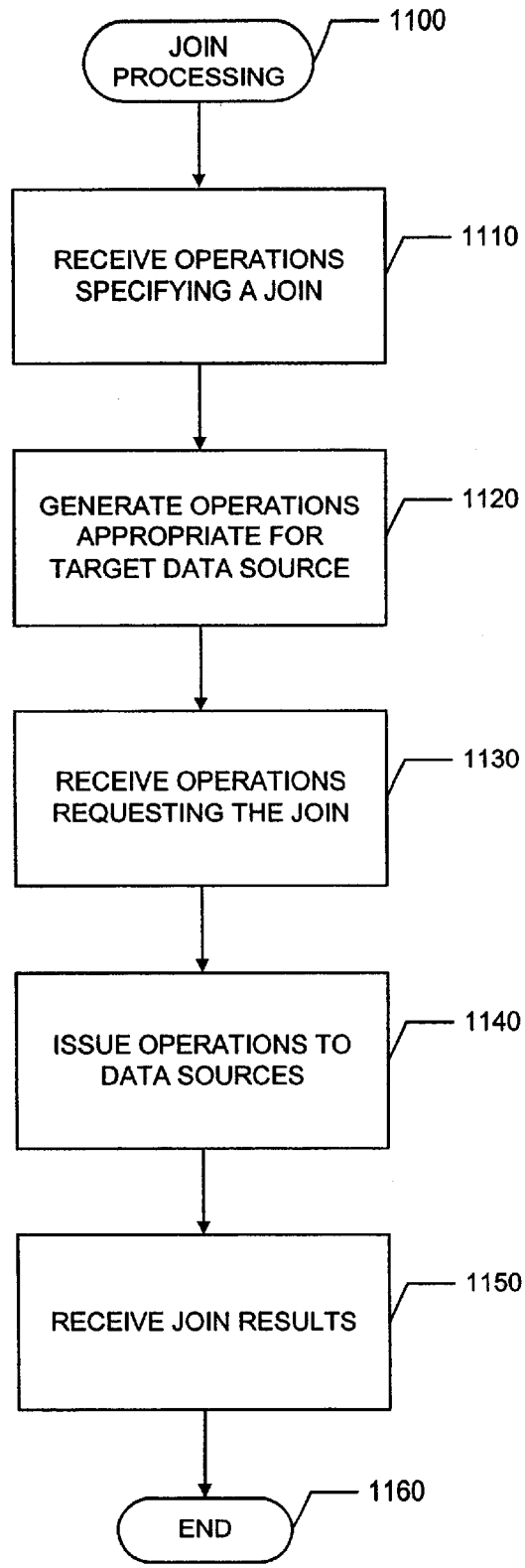
FIG. 11 is a block diagram illustrating join processing, according to one embodiment.

FIG. 11 shows join processing 1100, according to one embodiment of the invention. At block 1110 a VFS 110 receives operations specifying a join from a user or application. An exemplary set of manipulations may include: (1) creating a join folder (typically in a portion of the VFS 110 suitable for creating new or user-defined views), (2) copying a first folder that includes at least one first file node into the created join folder, (3) copying a second folder that includes at least one second file node into the created join folder. Copying the second source data container folder to the join folder may cause logic (e.g., the DMT 120) to convert the parent node to a join node. These manipulations may be implemented as multiple Createfile( ) operations, as follows: (1) Createfile( ) is called when the parent join folder is created in the VFS 110, (2) Createfile( ) is called for each of the files in the first source folder and file nodes are created in the VFS 110, (3) Createfile( ) is called for the second source folder and a directory node is created in the VFS 110, and (4) Createfile( ) is called for each of the files in the second source folder and file nodes are created in the VFS 110. Joins of three or more sets of data are also possible, such as by recursively joining a folder from Data Sources with an existing joined folder. Alternatively, a mechanism that permits the automatic detection of a predetermined set of operations involving three or more sets of data may be provided. In one approach, all the data from each of the tables is compiled in master files within the new directory to facilitate processing.

At block 1120 operations appropriate for the target data sources are generated. According to one embodiment, this may include accessing predetermined stored data corresponding to the data sources and actively obtaining additional information from a user to qualify the join operation. For example, the stored information may comprise previously available and general-purpose information about the data sources that is not specific to the join operation, such as address information for the data source, connection information, protocol information, security information, procedural preference information, data manipulation language information, structure information, and other information. This information may be provided when the data sources are initially set up. The join criteria may be further specified by actively requesting specifications and join parameters from the user or application. The parameters may specify criteria for selecting data for the join, such as those typically used in querying databases, and may include using Boolean operators (e.g., and, or, etc.). Join operations combine or concatenate data based on a criteria that typically involves a common attribute, column, field, or key. A GUI may be provided or additional functionality will be added to an existing GUI (e.g., a Microsoft Windows® Explorer GUI, property pages, or other), to assist with specifying the rows, columns, and join criteria, so that such operations are straightforward and intuitive. The interface may be used to specify rows and columns of the tables that are to be considered or used in the criteria. This may include selecting a subset of columns from a list of columns present in the table of interest. For example, the parameters may specify that the join is based on matching records (i.e., records occurring in both tables are included in the view), non-matching records (i.e., records that do not occur in both tables are included), all records, and based on other criteria. The specified join operation may be transformed into data manipulation language (e.g., SQL commands) to accomplish the specified join operation that is appropriate for the target data sources. The transformation may include selecting preexisting manipulation instructions from a plurality of preexisting manipulation instructions provided to accomplish a plurality of different join operations based on the specification of the join operation and combining the manipulation instructions with stored information about the target data sources.

At block 1130 operations requesting the join operation are received via the VFS 110. According to one embodiment, a user or application uses the VFS 110 to indicate, typically in a predetermined way, that the join data is requested. For example, a user or application may select, activate, or double click a folder or file in the VFS 110 that represents a join of data from multiple data sources.

At block 1140, data manipulation operations that are consistent with the specified join and that are appropriate for the data sources are issued to the data sources. According to one embodiment, logic such as software is provided (e.g., in the DMT 120) to automatically detect the manipulation and recognize that it represents a request for the join data associated with the previously specified join. Typically, existing instructions associated with the join operation may be accessed and used to interact with the data sources, although the instructions or data manipulation language may also be generated in real time after receiving the block 1140 manipulation.

Then, at block 1150, results associated with the operations are received. Optionally, these results may be transformed into another format for presentation or display. For example, a file corresponding to the join may be selected from the VFS 110 and the results presented in a format associated with the file.

According to one embodiment, join processing may be performed on a VFS representation 300 such as that shown in FIG. 3. The procedure may be substantially similar to the procedure used to create new views based on a single set of data, except that the criteria will indicate a join, and the procedure may be repeated for each set of data being joined. That is, rather than copying one folder into the newly created storage folder under the new-view folder 324, multiple folders will be copied in, and selection criteria may be provided for each set of data. As discussed above, the selection criteria typically includes joining based on one column the tables have in common, or that relate the tables. The criteria may join tables based on key columns, columns with the same names, columns with the same data type, or based on columns that are provided. The join can also be matching, non-matching, or all records. Frequently, a GUI will be provided to specify the criteria and will be activated by interacting with the VFS representation 300. In addition to joining sets of data from the data-sources folder 322, new views from the new-view folder 324 can also be incorporated in the joins. Specifying the joins involving these new views may be substantially as described for sets of data, according to one embodiment.

Other Processing

The VFS 110 may support other desired manipulations associated with file systems and operating systems, according to one embodiment. For example, the VFS 110 may support searching remote data sources for tables, or data, such as by using the Microsoft® Windows Explorer "find" functionality, replacing all occurrences of particular data in the data sources (e.g., to correct errors), use of macros, accepting command input (e.g., refreshing by depressing the F5 key), and other desirable features.

Caching VFS Data

According to one embodiment, data and/or structural information may be accessed before it is needed and added to a cache or pre-fetch cache for later use. The pre-fetch cache may be any type of memory or storage. The cache may be managed and accessed via the DMT 120 (e.g., either the FSI 235 or the DAM 240) and may be represented either in the actual file system or the virtual file system or both. The use of such a cache may improve speed or efficiency of using the VFS 110 to represent data sources that are connected by a communication medium that has slow bandwidth compared with a bandwidth for accessing data from the cache, and may also improve response time for end users. However, the motivation for using the cache is not a limitation of certain embodiments of the invention, and other motivations are contemplated.

A number of different pre-fetch strategies are contemplated to be useful for different implementations. One strategy includes pre-fetching according to a predetermined refresh rate or criteria, such as a user-specified refresh rate. Another strategy includes pre-fetching according to an indication from a data source, such as an indication that data and/or structure have changed. A third strategy includes pre-fetching when processing or communication resources are available. This may include monitoring the resources or aligning the pre-fetching to reduce potential bottlenecks, such as by spreading out the pre-fetch times with a random or pseudo-random schedule. Other strategies will be apparent to those skilled in the art. For example, in some implementations push technology in which the data sources play a more active role in filling the cache, may be preferred. In general, any type of strategy that accesses the data and/or structural information before it is needed (e.g., selected) may be used to populate the cache with the data and/or structural information.

An interface, such as a graphical user interface, may be used to select and/or define a particular strategy and specify parameters and/or values associated with the strategy. For example, the interface may be used to select pre-fetch according to a fixed refresh rate, specify the refresh rate, limit the amount of data simultaneously pre-fetched, limit computational time for performing an operation, and provide other specifications that are desired. Different strategies, parameters, and values may apply to different portions of the VFS 110, such as portions corresponding to different data sources.

A strategy based on a predetermined refresh interval will be discussed in greater detail. Typically, the actual interval depends on size of units of data in the data sources and how frequently the data changes. When the data changes frequently and the data tables are reasonably sized, comparatively short data refresh intervals (e.g., on the order of 20 seconds) may be preferable. Conversely, when the data is comparatively static longer refresh time intervals may be preferred.

Figure 12:
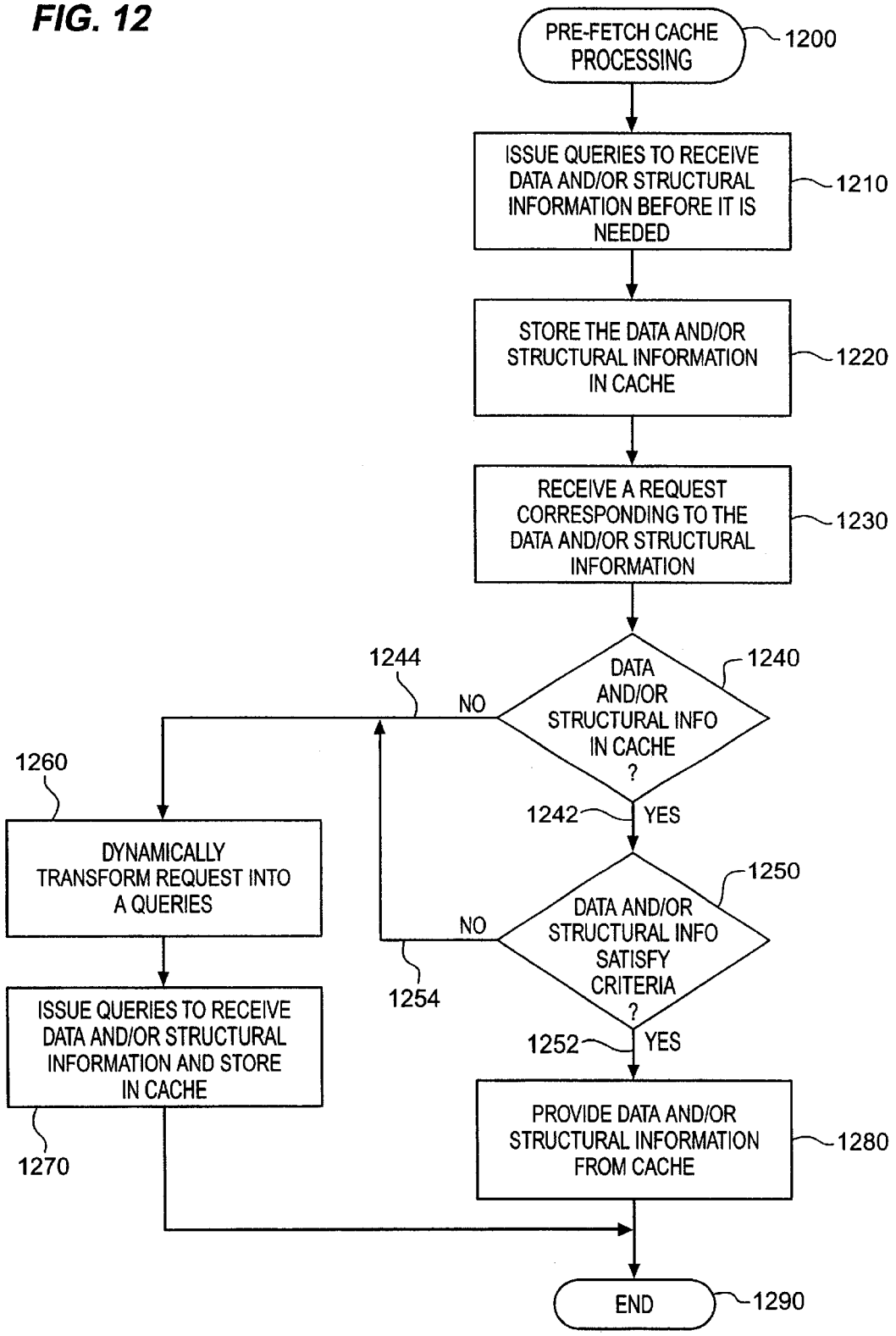
FIG. 12 is a block diagram illustrating pre-fetch cache processing, according to one embodiment.

The pre-fetch cache may be incorporated with the other operations, uses, and processing described in the present application, according to on& embodiment, by including desired processing that stores data in the cache and uses data from the cache. FIG. 12 shows pre-fetch cache processing 1200, according to one embodiment. At block 1210, one or more queries are issued to one or more application-accessible data sources in appropriate data manipulation language. The queries may be periodically issued according to a predetermined time interval, or may be issued according to other strategies. According to one embodiment, a Java applet may be provided at a data source to automate regular uploads of information into the pre-fetch cache, so that the cache maintains sufficiently current information. Result data and/or structural information associated with the queries is received.

At block 1220, the result data and/or structural information is stored in the cache. Traditional cache management operations like logging the data and deleting old data may be performed.

At block 1230, a request corresponding to the data and/or structural information is received. For example, data discovery processing, read processing, XML processing, join processing, or other processing may be initiated via a VFS 110.

At block 1240, a determination is made whether the data and/or structural information exists in the cache. If the data and/or structural information do exist in the cache 1242, processing proceeds to block 1250. If the data and/or structural information do not exist in the cache 1244, processing proceeds to block 1260.

At block 1260, the request is dynamically transformed into queries appropriate for one or more target data sources associated with the data and/or structural information. This may be performed as described elsewhere in the present application. For example, data discovery processing may be preformed if the request seeks structural information and read processing may be performed if the request seeks data.

At block 1270, the queries are issued to receive data and/or structural information, and the data and/or structural information may be received. Such "miss" events are typically not beneficial, and the pre-fetch cache will typically be managed to reduce such misses.

Assuming the data and/or structural information does exist in the cache 1242, at block 1250 a determination is made whether the data and/or structural information satisfy relevant criteria. Typically the criteria are associated with the strategy. For example, when a refresh interval of 10 minutes is used, the data may be considered fresh if the data and/or structural information has been in the cache for less than 5 minutes, and stale otherwise. Other freshness criteria are contemplated. If the data and/or structural information satisfy the criteria 1252, processing proceeds to block 1280. If the data and/or structural information do not satisfy the criteria 1254, processing proceeds to block 1260, which has been previously described.

At block 1280, data and/or structural information may be provided from the cache. For example, the data and/or structural information may be provided to a user or application associated with the request via the VFS 110. Such "hit" events, which occur when relevant data and/or structural information exists in the cache and satisfies any imposed criteria, are typically beneficial. The cache may log such hit events, to improve cache functioning. The cache may also log other information, such as red-flags from a data source that indicates certain data to be stale or incorrect.

A cache may also be used for different purposes than those discussed above, according to certain embodiments. In particular, the cache may be integrated more tightly with the instructions and communication mechanism. For example, simple data access commands may be used to access data from many different types of data sources (e.g., commands simpler than joins across different types of databases), the accessed data may be converted into a common convenient format (e.g., XML), the XML data 830 may be cached, and then comparatively more complicated commands may be used to operate on the data, which is now advantageously more consistent in format. In this way, more complicated views can be created with a simplified and reduced programming logic, where relatively complicated processing is supported in only the common data format.

Exemplary Uses and Advantages
Use in Local and Networked Environments

Figure 13:
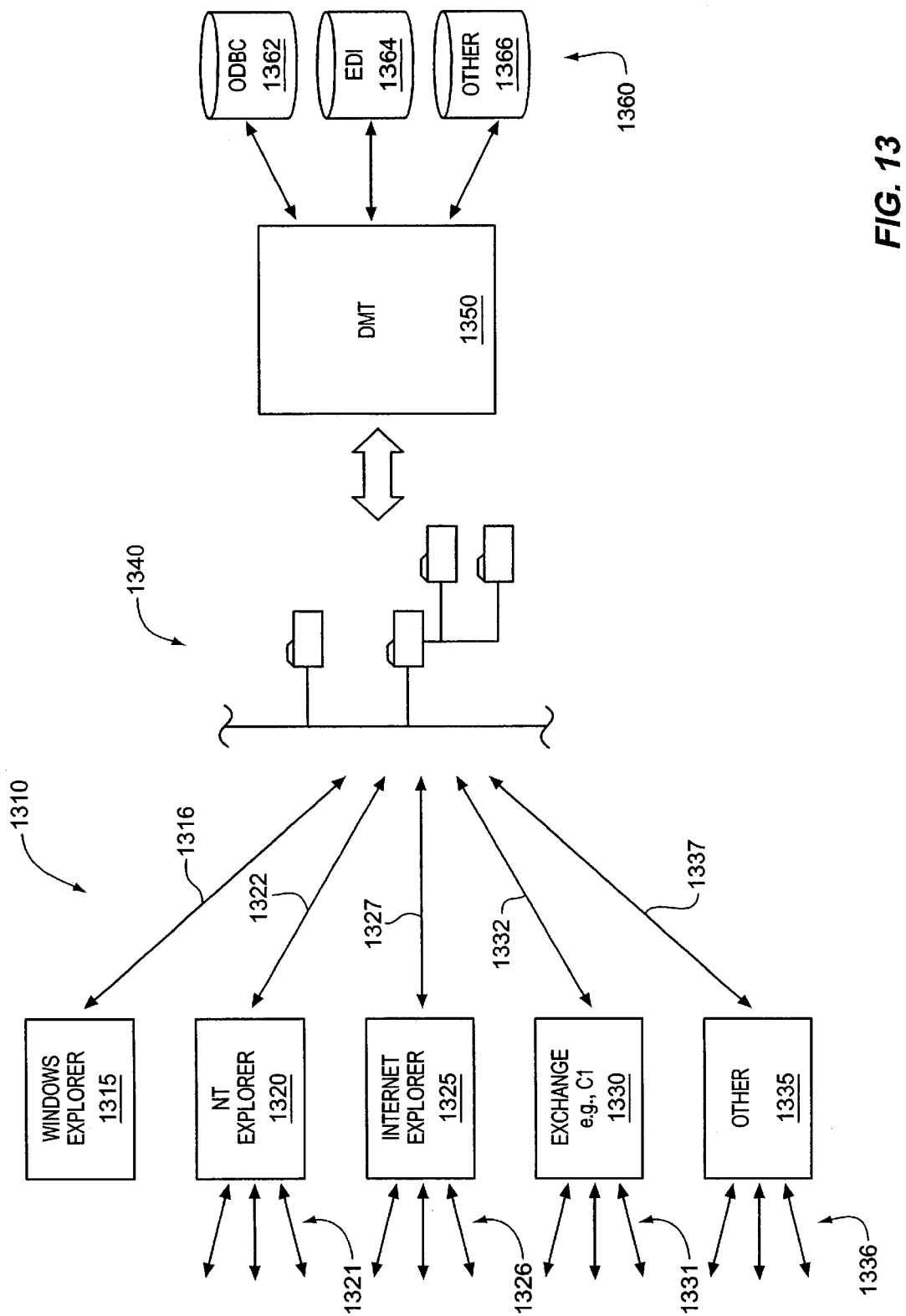
FIG. 13 conceptually illustrates different exemplary request generators using the virtual file system to access data sources, according to one embodiment.

FIG. 13 shows various types of request generators 1310 using a VFS 1340 and a DMT 1350 to access data from different types of data sources 1360 including an ODBC source 1362, an EDI source 1364, and another source of any type 1366. The VFS 1340, the DMT 1350, and the data sources 1360 may interact as described elsewhere in this application, although other forms of operation are contemplated and will be apparent to those skilled in the art.

Microsoft® Windows Explorer generator 1315 is one type of request generator in which a user with the VFS 1340 interacts 1316, such as by a request and a response, with the data sources 1360 via the VFS 1340 and a DMT 1350. For example, the user may manipulate the VFS 1340 via commands or a cursor control device and receive results associated with these manipulations.

Microsoft® NT Explorer generator 1320 is another type of request generator in which any number of networked computer users or applications 1321 interact with the Microsoft® NT Explorer generator to interact 1322 with the data sources 1360 via the VFS 1340 and the DMT 1350. The networked users and applications can be users or applications of different computer system platforms and operating systems, such as Windows, UNIX, Mac, and others.

Microsoft® Internet Explorer generator 1325 is another type of request generator in which one or more computer users or applications 1326 interact with the Microsoft® Internet Explorer generator to interact 1327 with the data sources 1360 via the VFS 1340 and the DMT 1350. This may include the users or applications using the Microsoft® Internet Explorer to interact with a remote VFS 1340 and DMT 1350 via the Internet, such as by sending a message 1327 that may be understood or interpreted as one or more operations on the VFS 1340. Alternatively, rather than a remote VFS 1340 and DMT 1350, the VFS 1340 and/or the DMT 1350 may be on a computer system local to the Microsoft® Internet Explorer generator and the Microsoft® Internet Explorer generator may interact via the Internet with the data sources 1360 by sending data manipulation commands to the data sources 1360 and receiving associated responses.

Exchange generator 1330 is another type of request generator in which one or more exchange users 1331 interact with the exchange generator 1330 and the exchange generator 1330 sends a corresponding message 1332 to the VFS 1340. An exchange generator may be users or applications that link through the exchange and generate the request. An "exchange" is broadly defined as an intranet, a commerce portal, a hub connecting buyers with suppliers, or an extranet that allows business partners to exchange data and perform transactions. An "extranet" may be a special intranet that has a selective firewall to allow partial access to authorized outsiders. A username and password may determine the level of access. Thus, an exchange includes B2B exchanges, such as The Global Trading Web™, available from Commerce One, Inc. of Pleasanton, Calif., as well as other exchanges from Ariba, and others. Likewise, the exchange generator can be any user or application of the exchange, such as an exchange generator to submit purchase orders or conduct other business operations.

The message is in a data manipulation language or format that is understood or capable of being interpreted as one or more operations on the VFS 1340. The message may be XML having a format associated with the exchange generator 1330 and existing stored information and instructions may be accessed to interpret the message. The message may indicate particular data sources 1360 and data. Consider the following exemplary XML-based purchase order, which may be similar to one used with Commerce One:

Sample XML Purchase Order

```
<?soxtype urn:x-commerceone:document:com:commerceone:CBL:CBL.sox$1.0?>
<?import urn:x-commerceone:document:com:commerceone:CBL:CBL.sox$1.0?>
<PurchaseOrder>
  <OrderHeader>
    <POIssuedDate>19991213T01:00:00</POIssuedDate>
    <RequestedDeliveryDate>19991020T00:00:59</RequestedDeliveryDate>
    <ShipByDate>19991120T00:00:00</ShipByDate>
    <OrderCurrency>USD</OrderCurrency>
    <OrderLanguage>en</OrderLanguage>
    <SpecialHandlingNote>Special Handling Note</SpecialHandlingNote>
    <GeneralNote>General Note</GeneralNote>
    <OrderHeaderAttachment></OrderHeaderAttachment>
  </OrderHeader>
  <ListOfOrderDetail>
    . . .
  </ListOfOrderDetail>
  <OrderSummary>
    <TotalAmount>11221.123</TotalAmount>
    <TotalLineNum>1</TotalLineNum>
  </ OrderSummary >
<PurchaseOrder>
```

As can be seen, the purchase order contains data within the tags that may be written to a data source or other applications used to process a business transaction. When sent to a VFS such as VFS 110 or VFS 1340, that represents multiple data sources, the purchase order may also include an indication of one of the data sources.

Typically, a portion of the VFS 1340 (or a data structure of the VFS 1340) corresponding to the indicated data source will be manipulated in a predetermined way to initiate generation of one or more file system requests corresponding to the predetermined manipulation. According to one embodiment, the VFS 1340 may include a folder for each of a plurality of exchanges. Each of these folders in turn contains a separate sub-folder for each transaction type typically performed on the exchange. Files may be read from these folders or written to these folders. For example, an exchange may write a purchase order into a sub-folder beneath a folder of the exchange, and business logic associated with the sub-folder may be used to process a transaction. Exemplary business transactions include price and inventory check, EDI or database-based purchase order processing, and order status checking. The logic may be provided in Java or other formats.

As discussed elsewhere, the file system requests may automatically lead to accessing existing stored instructions and information to determine a different data manipulation language, which may be more than merely a different dialect of the same language, compatible with the data source and generate a message appropriate for one or more target data sources 1360 (e.g., in a different data manipulation language). Results or data consistent with the message may be received from the data source and presented via the VFS 1340. The results may also be sent or issued to the exchange generator 1330, or other location associated with the requesting message, in a message generated based on the results and suitable for the exchange generator 1330 or location. According to one embodiment, the results message to the exchange generator 1330 or location may be substantially similar in format or language to the initial request message from the exchange generator 1330. For example, they may both be based on a particular dialect of XML.

Those skilled in the art will recognize that the interaction described above applies also to interactions with any number of potentially heterogeneous data sources 1360. Accordingly, in one embodiment, the exchange generator 1330 may send requests, messages, or commands in a native data manipulation language that is associated with the exchange generator 1330 but which is not appropriate or compatible for the data sources 1360 and due to the VFS 1340 and DMT 1350 may transparently receive results in an appropriate format, such as the native format, without even needing to know that the data sources 1360 are not compatible and do not understand the native format.

Another generator 1335 is another type of request generator in which one or more users or applications 1336 interact with the exchange generator 1336 and the exchange generator 1330 sends a corresponding message 1337 to the VFS 1340. Those skilled in the art will recognize that the VFS 1340 and DMT 1350 provide general applicability to environments not mentioned herein. For example, the users and applications may be simple machines, such as credit card or checking card processing machines that desire to access data sources 1360 having different formats. An additional advantage is that the data from such transactions may be written to both legacy databases and modern XML based databases, regardless of the format of the data sources 1360.

Figure 14:
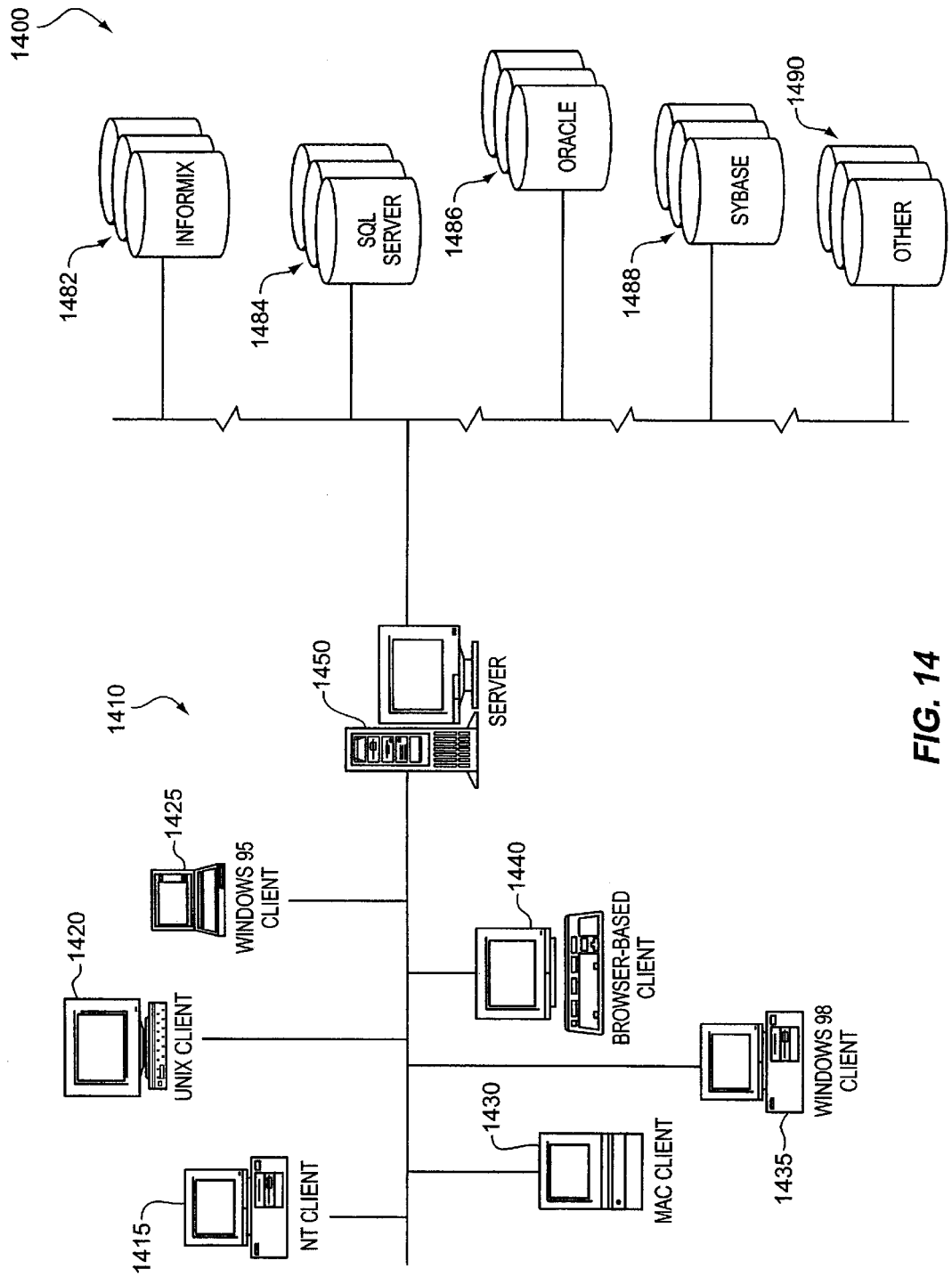
FIG. 14 conceptually illustrates an NT Explorer-based request generator accessing data sources, according to one embodiment.

FIG. 14 shows an exemplary use of an embodiment of the invention in a network environment. A network of computer systems 1410 may access, present, and manipulate multiple data sources 1480 having different formats through a Server. 1450, such as a Microsoft® NT Server, a Solaris server, or others. The network includes a Microsoft® NT client 1415, an UNIX client 1420, a Microsoft® Windows 95 client 1425, a Macintosh client 1430, a Microsoft® Windows 98 client 1435, and a browser-based client 1440. The NT server may provide a Microsoft® NT Explorer interface, a VFS 110 with an interface that is similar in appearance and/or use to the Explorer interface, and a DTM. The data sources include an Informix database 1482, an SQL server 1484, an Oracle database 1486, a Sybase database 1488, an XML data source 1490, and another data source 1492 of any type.

Use in a Market Exchange or Extranet

Figure 15:
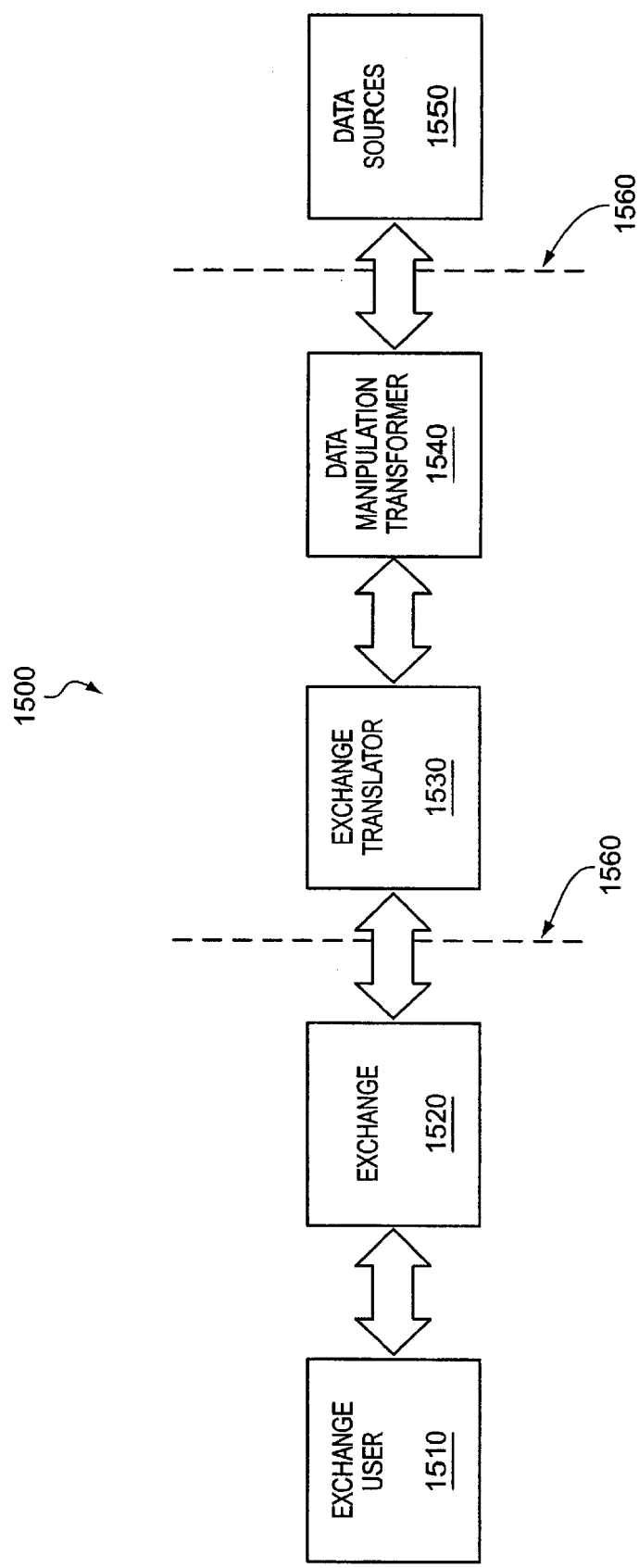
FIG. 15 conceptually illustrates an exchange-based request generator accessing data sources, according to one embodiment.

FIG. 15 conceptually illustrates a system 1500 for using an embodiment of the invention with an exchange 1520. The embodiment allows the exchange 1520 to access, present, and manipulate data from the data sources 1550.

A exchange user 1510 interacts with an exchange 1520 to either access, present, or manipulate data associated with data sources 1550. The exchange user 1510 may be a user or application desiring to make purchases associated with the data sources 1550. For example, the exchange user 1510 may be a buyer making B2B purchases using the exchange 1520. The exchange user 1510 may browse catalogs and check pricing and availability of products. The exchange user 1510 may use a browser for such objectives.

As discussed above, the exchange 1520 may be an intranet, a commerce portal, a hub connecting buyers with suppliers, or an extranet that allows business partners to exchange data and perform transactions. According to one embodiment, the exchange 1520 may be a B2B exchange, such as The Global Trading Web™, available from Commerce One, Inc. of Pleasanton, Calif. The exchange 1520 may include catalogs from multiple suppliers and include routing information so that purchase orders and other requests can be correctly routed in the system 1500.

In exchanges 1520 and other uses where security is an issue, security may be provided at multiple levels. For example, considering the extranet example, security may be provided at the web server level, the file system level, and the data sources level. This may allow control of who has access to information and who receives notifications through email, or wireless devices. Additional security, such as that involved in an e-commerce portal, may also be used. For example, SSL encryption may be used.

The exchange 1520 may use an embodiment of the invention to access data from several legacy databases of different types in XML format, use Extensible Stylesheet Language (XSL) to format the XML, and present the data on a shared extranet that suppliers can access. To facilitate such data exchanges, the business and suppliers frequently agree on a common document type definition (DTD) or XML schema and on common database record names. The business and suppliers may also send XML data for interpretation and processing by applications. The embodiment may allow the exchange 1520 to communicate in its native format and data manipulation languages, without modification to account for differences between its native format and the formats or languages associated with the data sources 1550. According to one embodiment, the data sources 1550 are registered with the exchange 1520, so that the message from the exchange 1520 indicates one or more applicable target data sources 1550. For example, the exchange 1520 may send a communication or message in XML format, with tags to indicate a data source (e.g., <datasource#1></datasource#1>) and tags to indicate data to access and present (e.g., <data#1></data#1>).

According to some embodiments, to facilitate the system and method, an exchange translator 1530 may be provided to facilitate interactions with the exchange 1520. The exchange translator 1530 typically provides services that include providing secure, efficient, authenticated, and validated communication with the exchange 1520. This may include complying with protocols and agreements of the exchange 1520. For example, the exchange translator 1530 may facilitate sending confirmation messages. The exchange translator 1530 may also facilitate security features associated with the exchange, such as de-enveloping and decoding messages. The exchange translator 1530 may aso facilitate interaction with a data source via a VFS and a DMT. For example, the exchange translator 1530 may have code or instructions to associate (e.g., <data#1></data#1>) with an internal XML format for the same data source and product (e.g., <productdatum#1></productdatum#1>). The exchange translator 1530 facilitates interpreting a message of the exchange 1520 and generating operations or manipulations consistent with the message that are appropriate for a VFS 110. This may include arranging a path specification identifying a particular data source and set of data, based on the message from the exchange 1520. Typically, the manipulations are in command-driven format.

The VFS 110, which for simplicity is not shown, the DMT 1540, and the data sources 1550 may interact substantially as previously described. Dashed lines 1560 enclose a software exchange translator 1530 and DMT 1540, which may be provided as software components to improve the exchange 1520, according to one embodiment.

Figure 16:
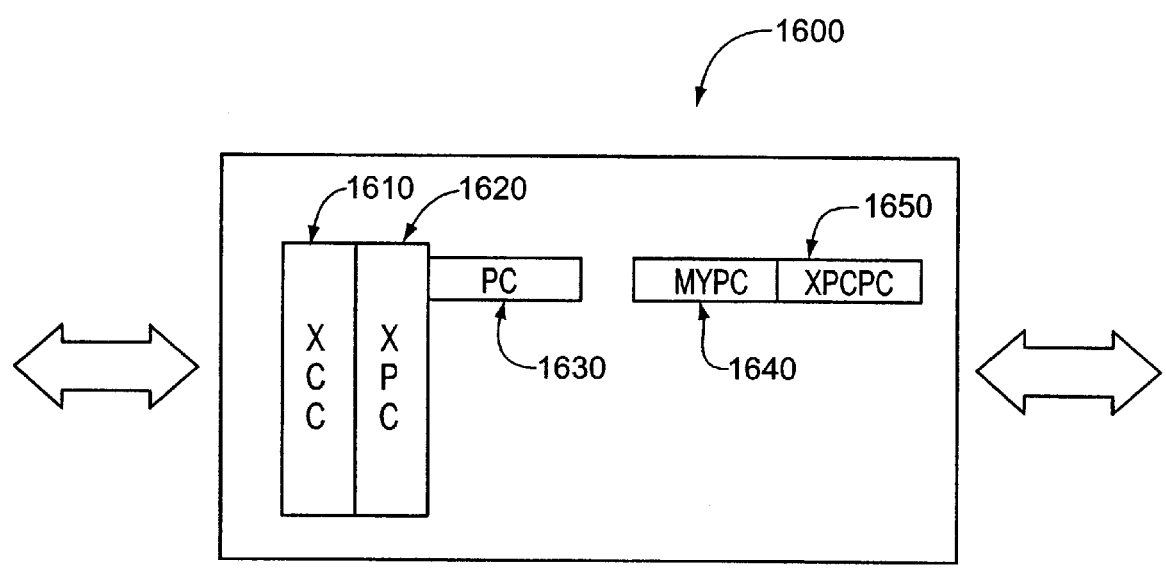
FIG. 16 conceptually illustrates an exchange translator, according to one embodiment.

FIG. 16 shows an exemplary exchange translator 1600, according to one embodiment of the invention. The exchange translator 1600 includes an XCC component 1610, an XPC component 1620, a PC component 1630, a MYPC component 1640, and an XPCPC component 1650. The XCC component 1610 may be based on XML Commerce Connector™ (XCC) technology, available from Commerce One. XCC technology is a communication technology that provides secure, efficient, authenticated, validated communication. The XPC component 1620, PC component 1630, MYPC component 1640, and XPCPC component 1650 may be based on XML Portal Connector (XPC) technology, also available from Commerce One that is used to provide a direct and seamless interface between trading partners back-office computer systems, or data sources, and a Commerce One Exchange.

Considering one exemplary embodiment in which the exchange is Commerce One, the exchange interface may include functionality associated with XML Portal Connector (XPC), which provides a seamless interface typically for a supplier to connect to Commerce One's e-marketplaces. XPC is based on Commerce One's XML Commerce Connector™ (XCC) technology, which has functionality for secure, authenticated, and validated communication. The exchange translator may also include an XPC component that links to a computer system comprising middleware software with characteristics described above. This may be very analogous to configuring for different drivers and other middleware software. So, the exchange interface may be comprised of both XPC and XCC functionalities. Depending on the particular implementation, configuring the exchange interface may be very similar to configuring XPC and XCC-based interfaces for suppliers into the exchange.

Figure 17:
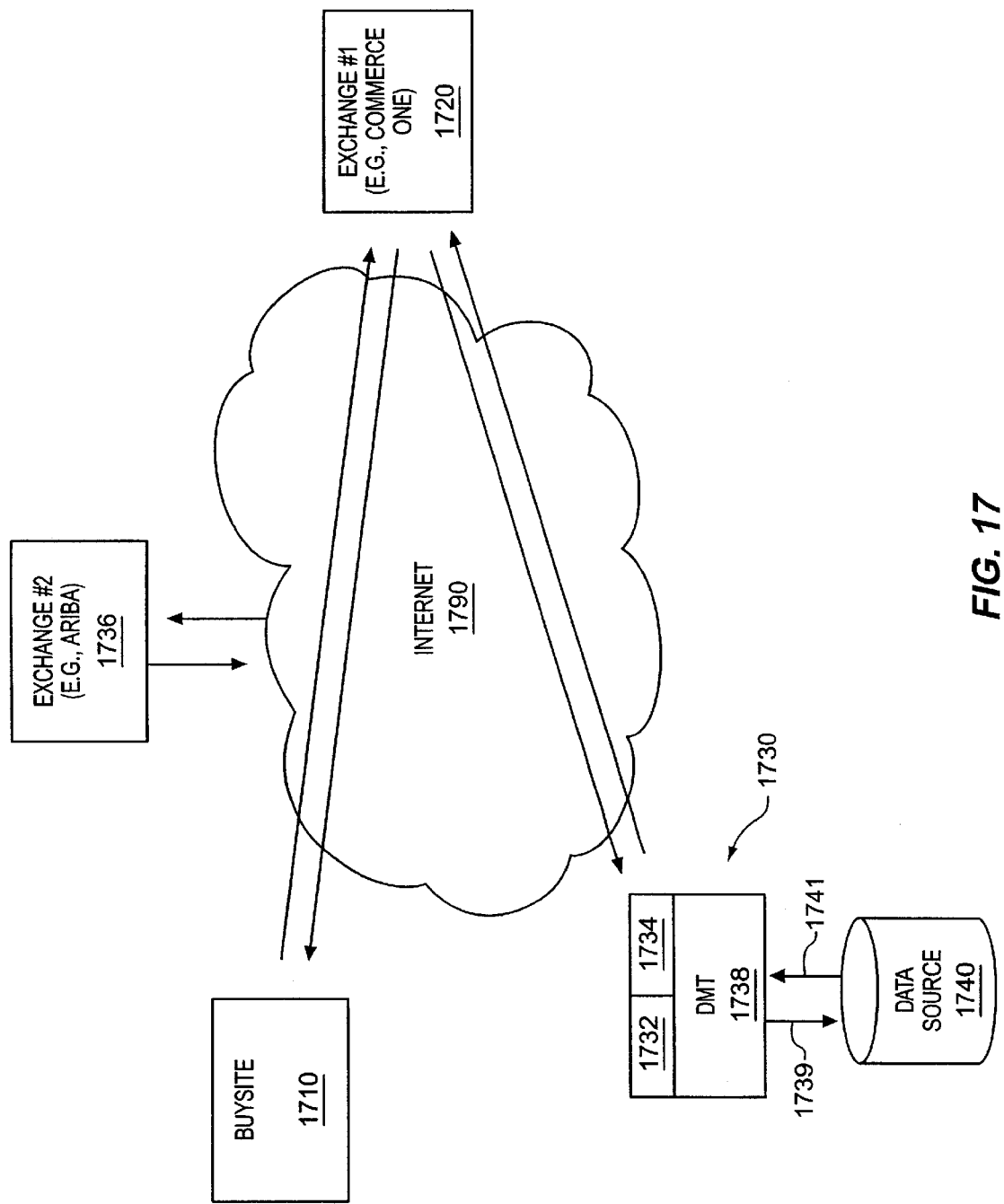
FIG. 17 conceptually illustrates a exchange user accessing a data source through an exchange, according to one embodiment.

FIG. 17 shows an embodiment to access and present data from a data source 1740. A exchange user 1710 sends a message or communication 1715 to an exchange #1 1720 via the Internet 1790. For example, the message may be a request for data from two vendors, which may constitute a join operation. The exchange sends another message 1725 via the Internet to middleware 1730 that functionally sits in front of a data source 1740 1740. Specifically, the middleware includes an exchange translator corresponding to the exchange 1732 and another exchange translator 1734 corresponding to another exchange like exchange 1736. The exchange translator facilitates interpretation and use of the message. A VFS 110, which is not shown, receives manipulations consistent with the message 1725 and interacts with a DMT 1738 as previously described. The DMT sends data manipulation commands 1739 appropriate for the data source 1740 1740 and receives results. 1741. The results are transformed into a format appropriate for the exchange, such as the format of the message 1725, and these results 1745 are sent to the exchange #1 1720. The exchange then re-presents the results 1750 to the exchange user 1710, such as in a format suitable for viewing via a browser. The exchange user 1710 may then purchase of a product corresponding to the information, or perform other business interactions. The exchange may then write a purchase order to one of the data sources 1740 and perform other operations common to such business environments.

Although FIG. 17 shows a particular arrangement of the exchange user 1710, the exchange #1 1720, the data source 1740, the exchange translator 1732, the VFS 110, and the DMT 1738, the actual way that these components are distributed over a network or the Internet is not a limitation of most embodiments. The exemplary embodiment shown represents only one approach. In other approaches the exchange translator 1732, the VFS 110, and the DMT 1738 may be associated with the exchange #1 1720 or located elsewhere on the Internet. In one embodiment, the exchange translator, the VFS 110, and the DMT may serve multiple heterogeneous data sources, rather than a single data source. For example, the exchange translator, the VFS 110, and the DAM 240 may reside at a shared server location and serve multiple data sources. Such components may be more elaborate to design compared to the shown embodiment, since instructions may be provided for multiple message conversions, although such an approach may be preferred in certain embodiments of the invention. In this approach, a collective VFS 110 may be used to represent a plurality of data sources. Data sources may also be located on a non-Internet network functionally behind the exchange. Likewise, other approaches are possible. The particular approach and other issues of distribution will frequently depend on marketing, economic, and other factors in addition to technical factors such as programming and transmission bandwidth limitations.

Mapping Data

In addition to use in operation of the exchange, embodiments may provide a number of advantages associated with mapping different types of data and in connecting data sources, such as suppliers having legacy databases, to an exchange. Typically, such operations are time consuming and expensive, however certain VFS interfaces provide a convenient, intuitive, and efficient way of performing such connections.

Typically, a GUI or other interface associated with the VFS 110 is used to map the data sources into a particular XML dialect associated with the exchange. The interface may also allow a map to be easily and intuitively created, such as through dragging-and-dropping the needed elements. In one embodiment, a map may be created to convert data from an EDI data source (e.g., ANSI X12 or EDIFACT) to XML. In this way, the VFS 110 may be used to quickly and efficiently modify the way XML is automatically generated from structured data associated with a data source. This map may be created once and distributed with minimal modification to many suppliers. Similarly, XML in one dialect may be easily mapped to another dialect. After such mapping is performed, translation may be performed in real-time without altering either the exchange or the data source. This may be useful in joining legacy databases into an Internet marketplace that is based on a common data format, such as a particular dialect of XML.

Other Uses and Advantages

Thus, as discussed above, embodiments of the invention offer a number of advantages, including using existing, intuitive, well-known interfaces to easily navigate, access, present, and manipulate data from any number of data sources having different formats. Those skilled in the art will readily recognize other advantages and uses in addition to those explicitly disclosed. For example, they will recognize that embodiments may be used to create a unique file-sharing system via the Internet. Another embodiment could be used in an Internet file system environment, in which storage space available on the Internet is treated as local file system data by using the VFS 110. Another embodiment could be used to provide content via small portable mobile devices such as palm pilots, personal digital assistants, and other such devices. In one embodiment, a graphical representation of a VFS 110 may be presented via the device to allow access and presentation of data from remote devices like email, phone messages, bank accounts, stock accounts, and other places. The device may then use simple messages to communicate with the VFS 110, which then uses instructions to generate more complicated messages appropriate for the data sources. Still another embodiment may be used to compile data from multiple data sources for sale, backup, and other purposes. Accordingly, other uses and advantages are contemplated.

Exemplary Computer Architecture

As discussed herein, a "system" or "computer system", such as a system for accessing, presenting, and manipulating general-purpose data sources responsive to virtual file system operations, may be an apparatus including hardware and/or software for processing data. The system may include, but is not limited to, a computer (e.g., portable, laptop, desktop, server, mainframe, etc.), hard copy equipment (e.g., optical disk burner, printer, plotter, fax machine, etc.), and the like.

Figure 18:
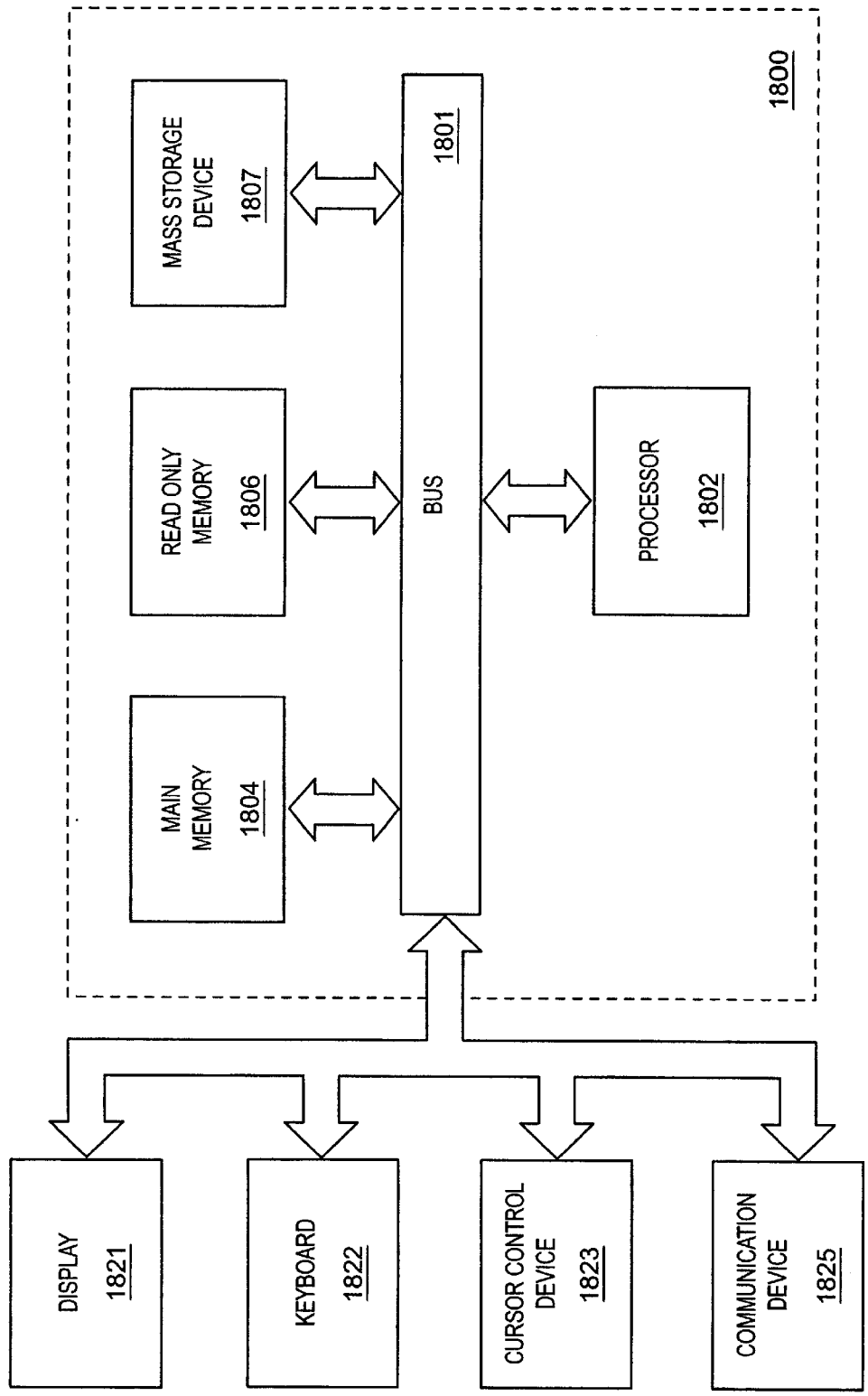
FIG. 18 is a block diagram of a computer system upon which one embodiment of the invention may be implemented.

A computer system 1800 representing an exemplary workstation, host, or server in which features of the present invention may be implemented will now be described with reference to FIG. 18. The computer system 1800 rep resents one possible computer system for implementing embodiments of the present invention, however other computer systems and variations of the computer system 1800 are also possible. The computer system 1800 comprises a bus or other communication means 1801 for communicating information, and a processing means such as processor 1802 coupled with the bus 1801 for processing information. The computer system 1800 further comprises a random access memory (RAM) or other dynamic storage device 1804 (referred to as main memory), coupled to the bus 1801 for storing information and instructions to be executed by the processor 1802. The main memory 1804 also may be used for storing temporary variables or other intermediate information during execution of instructions by the processor 1802. In one embodiment, the main memory 1804 may be used for storing the operating system, the file system, and application programs/modules such as the DMT 120 (e.g., FSI 235 and DAM 240), data structures, VFS representations, coded instructions, rule sets, and other types of data. The main memory 1804 may also be used to implement the on-demand or pre-fetch cache. The computer system 1800 also comprises a read only memory (ROM) and other static storage devices 1806 coupled to the bus 1801 for storing static information and instructions for the processor 1802, such as the BIOS. A data storage device 1807 such as a magnetic disk, zip, or optical disc and its corresponding drive may also be coupled to the computer system 1800 for storing information and instructions. In one embodiment, the data storage device 1807 may be used to compile data from several different data sources, such as for backup, analysis, conversion, sale, or other purposes.

The computer system 1800 may also be coupled via the bus 1801 to a display device 1821, such as a cathode ray tube (CRT) or Liquid Crystal Display (LCD), for displaying information to an end user. The display device may be used to display certain VFS representations and GUIs discussed in this application. Typically, a data in put device 1822, such as a keyboard or other alphanumeric input device including alphanumeric and other keys, may be coupled to the bus 1801 for communicating information and command selections to the processor 1802. Another type of user input device is a cursor control device 1823, such as a mouse, a trackball, or cursor direction keys for communicating direction information and command selections to the processor 1802 and for controlling cursor movement on the display 1821.

A communication device 1825 is also coupled to the bus 1801. Depending upon the particular implementation, the communication device 1825 may include a modem, a network interface card, or other well-known interface devices, such as those used for coupling to Ethernet, token ring, or other types of physical attachment for purposes of providing a communication link to support a local or wide area network, for example. In any event, in this manner, the computer system 1800 may be coupled to a number of clients or servers via a conventional network infrastructure, such as a company's intranet, an extranet, or the Internet, for example. The communication device may be used to send requests for data manipulation (e.g., data manipulation commands), and write data to other computer systems, and to receive results corresponding to the requests or commands.

Embodiments of the invention are not limited to any particular computer system. Rather, embodiments may be used on any stand alone, distributed, networked, or other type of computer system. For example, embodiments may be used on one or more computers compatible with NT, Linux, Windows, Macintosh, any variation of Unix, or others.

The present invention includes various steps, as described above. The steps of the present invention may be performed by hardware components or may be embodied in machine-executable instructions, which may be used to cause a general-purpose or special-purpose processor or logic circuits programmed with the instructions to perform the steps. The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection). Alternatively, the steps may be performed by a combination of hardware and software.

In conclusion, embodiments of the present invention provide an approach for presenting one or more general-purpose application-accessible data sources as an XML representation. This approach provides portability and extends the reach and uses of structured data in legacy and other non-XML data sources.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

accessing first structural information that describes how database data is organized in a first application-accessible data source;

representing said first structural information with a first hierarchical representation comprising a plurality of folders;

modifying the first hierarchical representation to create a second hierarchical representation;

converting said second hierarchical representation to a first file containing a plurality of human readable data delimiters that correspond to the second hierarchical representations;

accessing second structural information that describes how database data is organized in a second application-accessible data source, said second application-accessible data source being separate and distinct from said first application-accessible data source;

representing said second structural information with a third hierarchical representation comprising a plurality of folders;

modifying the third hierarchical representation to create a fourth hierarchical representation;

converting said fourth hierarchical representation to a second file containing a plurality of human readable data delimiters that correspond to the fourth hierarchical representation.

2. The method of claim 1, wherein converting comprises generating an XML representation comprised of human-readable XML tags.

3. The method of claim 2:

wherein accessing comprises accessing structural information that describes a structure of database data in a relational database, the structural information including an indication of a table and an indication of a column; and wherein representing comprises representing the column with a folder;

wherein modifying comprises modifying a name of the folder; and wherein converting comprises generating a tag based on the modified name.

4. The method of claim 2, wherein accessing includes querying the data source to determine a plurality of data objects included in the data source.

5. The method of claim 2, wherein representing further comprises:

providing a folder to represent the data source;

providing within the folder a plurality of folders to represent a plurality of data objects indicated by the structural information; and providing within at least one of the plurality of folders an additional plurality of folders to represent a substructure of a data object, the substructure indicated in the structural information.

6. The method of claim 2:

wherein representing comprises representing a column in the data source with a folder in the first hierarchical representation; and wherein converting comprises mapping the folder to an XML tag.

7. The method of claim 2, wherein modifying includes modifying an order of the plurality of folders.

8. The method of claim 2, wherein modifying comprises modifying a name of a folder of the plurality.

9. The method of claim 2, wherein modifying comprises modifying by using a cursor control device to move a folder.

10. The method of claim 1, wherein modifying comprises modifying by using an existing data structure comprising mapping information to map a folder in the first hierarchical representation to a pair of XML tags.

11. The method of claim 10, wherein the existing stored data structure comprises an XML document type definition.

12. An XML data structure comprising data from the data source in machine-readable format created by the method of claim 1.

13. A machine-readable medium having stored thereon data representing sequences of instructions that when executed cause a machine to:
   access first structural information that describes how database data is organized in a first application-accessible data source;
   represent the first structural information with a first hierarchical representation comprising a plurality of folders;
   modify the first hierarchical representation to create a second hierarchical representation;
   convert said second hierarchical representation to a first file containing a plurality of human readable data delimiters that correspond to the second hierarchical representation;
   access second structural information that describes how database data is organized in a second application-accessible data source, said second application-accessible data source being separate and distinct from said first application-accessible data source,
   represent the second structural information with a third hierarchical representation comprising a plurality of folders;
   modify the third hierarchical representation to create a fourth hierarchical representation; and
   convert said fourth hierarchical representation to a second file containing a plurality of human readable data delimiters that correspond to the fourth hierarchical representation.

14. The machine-readable medium of claim 13, wherein the instructions to convert said second hierarchical representation further comprise instructions causing the machine to generate an XML representation comprising a pair of human-readable tags that describe a data element associated with the data source.

15. The machine-readable medium of claim 14:
   wherein the instructions to access further comprise instructions causing the machine to access structural information that describes a structure of database data in a relational database, the structural information including an indication of a table and an indication of a column; and
   wherein the instructions to represent further comprise instructions causing the machine to wherein represent comprises representing the column with a folder;
   wherein the instructions to modify further comprise instructions causing the machine to wherein modify comprises modifying a name of the folder; and
   wherein the instructions to generate further comprise instructions causing the machine to wherein generate comprises generating a tag based on the modified name.

16. The machine-readable medium of claim 14, wherein the instructions to represent further comprise instructions causing the machine to:
   provide a folder to represent the data source;
   provide within the folder a plurality of folders to represent a plurality of data objects indicated by the structural information; and
   provide within at least one of the plurality of folders an additional plurality of folders to represent a substructure of a data object, the substructure indicated in the structural information.

17. The machine-readable medium of claim 13,
   wherein the instructions to represent further comprise instructions causing the machine to represent a column in the data source with a folder in the first hierarchical representation; and
   wherein the instructions to generate further comprise instructions causing the machine to map the folder to an XML tag.

18. An apparatus comprising:
   means for accessing first structural information that describes how database data is organized in a first application-accessible data source;
   means for representing said first structural information with a first hierarchical representation comprising a plurality of folders;
   means for modifying the first hierarchical representation to create a second hierarchical representation;
   means for converting said second hierarchical representation to a first file containing a plurality of human readable data delimiters that correspond to the second hierarchical representation;
   means for accessing second structural information that describes how database data is organized in a second application-accessible data source, said second application-accessible data source being separate and distinct from said first application-accessible data source;
   means for representing said second structural information with a third hierarchical representation comprising a plurality of folders;
   means for modifying the third hierarchical representation to create a fourth hierarchical representation;
   means for converting said fourth hierarchical representation to a second file containing a plurality of human readable data delimiters that correspond to the fourth hierarchical representation.

19. The apparatus of claim 18, wherein means for converting comprises means for generating an XML representation comprised of human-readable XML tags.

20. The apparatus of claim 19:
   wherein means for accessing comprises means for accessing structural information that describes a structure of database data in a relational database, the structural information including an indication of a table and an indication of a column;
   wherein means for representing comprises means for representing the column with a folder;
   wherein means for modifying comprises means for modifying a name of the folder; and
   wherein means for converting comprises means for generating a tag based on the modified name.

21. The apparatus of claim 19, wherein means for accessing includes means for querying the data source to determine a plurality of data objects included in the data source.

22. The apparatus of claim 19, wherein means for representing further comprises:

means for providing a folder to represent the data source;

means for providing within the folder a plurality of folders to represent a plurality of data objects indicated by the structural information; and means for providing within at least one of the plurality of folders an additional plurality of folders to represent a substructure of a data object, the substructure indicated in the structural information.

23. The apparatus of claim 19:

wherein means for representing comprises means for representing a column in the data source with a folder in the first hierarchical representation; and wherein means for converting comprises means for mapping the folder to an XML tag.

24. The apparatus of claim 19, wherein means for modifying includes means for modifying an order of the plurality of folders.

25. The apparatus of claim 19, wherein means for modifying comprises means for modifying a name of a folder of the plurality.

26. The apparatus of claim 19, wherein means for modifying comprises means for modifying by using a cursor control device to move a folder.

27. The apparatus of claim 18, wherein means for modifying comprises means for modifying by using an existing data structure comprising mapping information to map a folder in the first hierarchical representation to a pair of XML tags.

28. The apparatus of claim 27, wherein the existing stored data structure comprises an XML document type definition.

* * * * *